United States Patent
Olafsson et al.

(10) Patent No.: US 7,634,070 B2
(45) Date of Patent: *Dec. 15, 2009

(54) MODEM WITH HOLD AND QUICK CONNECT FUNCTIONALITY

(75) Inventors: Sverrir Olafsson, Reykjavik (IS); Andrew Webster, Irvine, CA (US); Craig E. Borden, Placentia, CA (US); Charles F. Raasch, Lake Forest, CA (US); Nimesh Doshi, Anaheim, CA (US); Burk Beadle, Irvine, CA (US); Robert T. Otten, Orange, CA (US)

(73) Assignee: Silicon Laboratories Inc., Austin, TX (US)

( * ) Notice: Subject to any disclaimer, the term of this patent is extended or adjusted under 35 U.S.C. 154(b) by 783 days.

This patent is subject to a terminal disclaimer.

(21) Appl. No.: 11/412,809

(22) Filed: Apr. 27, 2006

(65) Prior Publication Data
US 2006/0210037 A1  Sep. 21, 2006

Related U.S. Application Data

(63) Continuation of application No. 11/072,776, filed on Mar. 3, 2005, now Pat. No. 7,587,034, which is a continuation of application No. 09/393,616, filed on Sep. 10, 1999, now Pat. No. 6,912,276, which is a continuation-in-part of application No. 09/394,018, filed on Sep. 10, 1999, now Pat. No. 6,768,791, which is a continuation-in-part of application No. 09/361,842, filed on Jul. 27, 1999, now Pat. No. 6,819,749.

(60) Provisional application No. 60/128,874, filed on Apr. 12, 1999.

(51) Int. Cl.
*H04M 11/00* (2006.01)

(52) U.S. Cl. .................. 379/93.35; 379/93.32

(58) Field of Classification Search .............. 379/93.35, 379/93.32, 93.31
See application file for complete search history.

(56) References Cited

U.S. PATENT DOCUMENTS 3,626,107 A  12/1971  Armstrong
(Continued)

FOREIGN PATENT DOCUMENTS

EP  0409641 A2  7/1990
(Continued)

OTHER PUBLICATIONS

"V.90" Sep. 1998, ITU-T Telecommunication Standardization Section of ITU, the whole document.
Multitech "V.92 Q&A", Internet, Online, Sep. 5, 2000, Retrieved from the Internet: url:htt://www.multich.com/applications/data_fax/v92.asp.

*Primary Examiner*—Stella L Woo
(74) *Attorney, Agent, or Firm*—O'Keefe, Egan, Peterman & Enders LLP

(57) ABSTRACT

A modem to modem communication system supports call waiting services by exchanging hold request and acknowledge signals before relinquishing the line servicing incoming calls. Thereafter, the modem to modem session is reestablished without having to redial. The hold request may be denied or accepted, and may define the duration a modem will hold before hanging up. The holding modem maintains the session by fooling the higher protocol layers, making them believe that the modem is not on hold. Three-way calling services are also used to free up the shared line for outgoing calls while maintaining the session with holding modems. A table may be employed to screen incoming calls through a comparison of the caller ID information with that in the table. The table may be within the modem or the host computer. A quick startup procedure for a modem system utilizes known characteristics of a previously established communication channel to reduce the initialization period associated with subsequent connections over the same channel.

30 Claims, 13 Drawing Sheets

U.S. PATENT DOCUMENTS

| | | |
|---|---|---|
| 4,578,796 A | 3/1986 | Charalambous et al. |
| 4,598,367 A | 7/1986 | DeFrancesco et al. |
| 4,621,366 A | 11/1986 | Cain et al. |
| 4,852,151 A | 7/1989 | Dittakavi et al. |
| 4,894,847 A | 1/1990 | Tjahjadi et al. |
| 4,995,074 A | 2/1991 | Goldman et al. |
| 5,127,051 A | 6/1992 | Chan et al. |
| 5,131,025 A | 7/1992 | Hamasaki |
| 5,287,401 A | 2/1994 | Lin |
| 5,317,594 A | 5/1994 | Goldstein |
| 5,367,563 A | 11/1994 | Sainton |
| 5,513,251 A | 4/1996 | Rochkind et al. |
| 5,519,767 A | 5/1996 | O'Horo et al. |
| 5,550,908 A | 8/1996 | Cai et al. |
| 5,600,712 A | 2/1997 | Hanson et al. |
| 5,651,060 A | 7/1997 | Cohn et al. |
| 5,668,861 A | 9/1997 | Watts |
| 5,684,825 A | 11/1997 | Ko |
| 5,729,594 A | 3/1998 | Klingman |
| 5,757,890 A | 5/1998 | Venkatakrishnan |
| 5,764,278 A | 6/1998 | Nagao |
| 5,764,736 A | 6/1998 | Shachar et al. |
| 5,796,808 A | 8/1998 | Scott et al. |
| 5,802,153 A | 9/1998 | Sridhar et al. |
| 5,828,744 A | 10/1998 | Nemoto |
| 5,862,474 A | 1/1999 | Kimball |
| 5,896,444 A | 4/1999 | Perlman et al. |
| 5,903,602 A | 5/1999 | Torkkel |
| 5,940,489 A | 8/1999 | Cohn et al. |
| 6,104,800 A | 8/2000 | Benson |
| 6,345,071 B1 | 2/2002 | Hamdi |
| 6,430,219 B1 | 8/2002 | Zuranski et al. |
| 6,574,239 B1 | 6/2003 | Dowling et al. |
| 6,704,399 B1 | 3/2004 | Olafsson |
| 6,768,791 B1 * | 7/2004 | Olafsson et al. .......... 379/93.32 |
| 6,785,371 B1 | 8/2004 | Olafsson |
| 6,819,749 B1 | 11/2004 | Olafsson et al. |
| 6,842,509 B2 | 1/2005 | Olafsson |
| 6,912,276 B1 * | 6/2005 | Olafsson et al. .......... 379/93.35 |
| 6,922,467 B2 | 7/2005 | Olafsson |
| 7,027,573 B2 * | 4/2006 | Olafsson et al. .......... 379/93.32 |
| 2001/0040945 A1 | 11/2001 | Fujino et al. |

FOREIGN PATENT DOCUMENTS

| | | |
|---|---|---|
| EP | 0409641 A3 | 7/1990 |
| EP | 0409641 B1 | 7/1990 |
| EP | 0601260 A1 | 12/1992 |
| EP | 0601260 B1 | 12/1992 |
| EP | 0711060 A1 | 10/1995 |
| EP | 0741481 A2 | 4/1996 |
| EP | 0812096 A2 | 5/1997 |
| EP | 0812096 A3 | 5/1997 |
| FR | 2771577 | 11/1997 |
| WO | WO9605684 A1 | 7/1995 |
| WO | WO97/49228 A1 | 5/1997 |
| WO | WO99/27702 A1 | 11/1998 |
| WO | WO99/31813 A2 | 12/1998 |
| WO | WO99/48304 A2 | 3/1999 |
| WO | WO99/31813 A3 | 6/1999 |

* cited by examiner

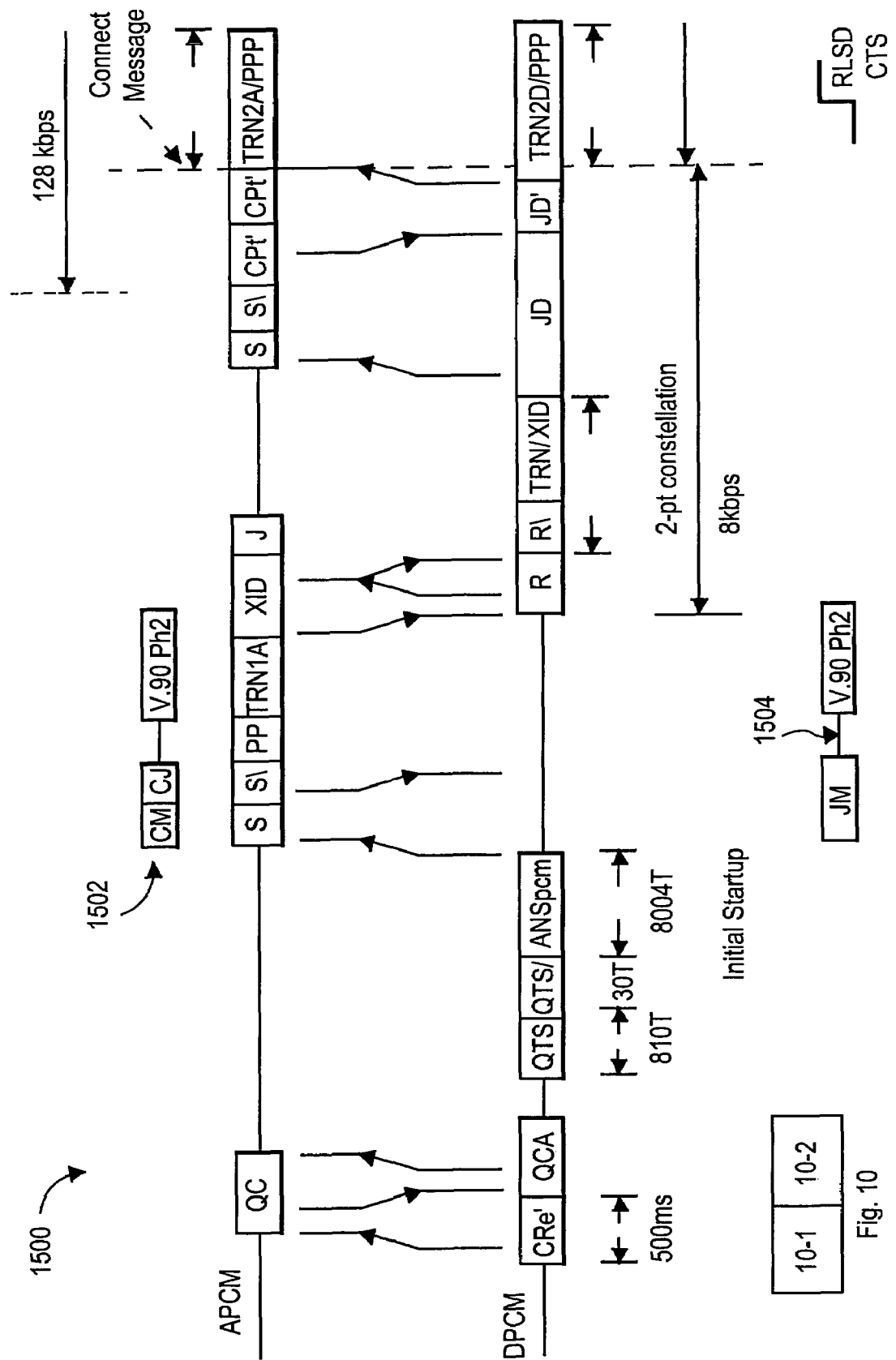

MODEM WITH HOLD AND QUICK CONNECT FUNCTIONALITY

CROSS REFERENCES TO RELATED APPLICATIONS

This application is a continuation of U.S. application Ser. No. 11/072,776 filed Mar. 3, 2005 now U.S. Pat. No. 7,587,034 which is a continuation of U.S. application Ser. No. 09/393,616, filed Sep. 10, 1999, now U.S. Pat. No. 6,912,276, which is a continuation-in-part of U.S. application Ser. No. 09/394,018, filed Sep. 10, 1999, now U.S. Pat. No. 6,768,791, which is a continuation-in-part of U.S. patent application Ser. No. 09/361,842, filed Jul. 27, 1999, now U.S. Pat. No. 6,819,749, which claims the benefit of U.S. Provisional Patent Application Ser. No. 60/128,874, filed Apr. 12, 1999, all of which are hereby incorporated herein by reference in their entirety.

BACKGROUND

1. Technical Field

The present invention relates to the field of modem to modem data communication; and, more specifically, it relates to a modem to modem communication and three-way calling and call waiting telephony services. The present invention also relates to the initialization and reconnection of a V.90 modem system.

2. Description of Related Art

A conventional communication system typically establishes an Internet data session through a local and a remote ISP (Internet Service Provider) modem via a telephone switching network. Similarly, other modem to modem communication uses the telephone switching network as the communication link. Such modems often share a single telephone line with other local telephony devices, e.g., telephones, facsimile machines, answering machines, etc.

To handle multiple incoming calls, telephone switching networks offer three-way calling and call waiting services. Such services can be accessed through manual interaction of a person using a telephone. Telephone switching networks have also added caller identification (caller ID) services to support call waiting. Thus, the person using the telephone may view the caller ID before deciding to accept an incoming call during a ongoing telephone conversation.

To maintain a data session between modems, continuous modem connection must be maintained during the data session. If after a period of time the modem signaling is lost, modems will conclude that the data session has been terminated and will disconnect.

When a telephone call waiting tone (indicating the presence of caller ID) is detected during a local modem to remote modem data session, a decoding process involving both the local modem and a telephone switching network CO (Central Office) may be undertaken to retrieve the caller ID. During the caller ID decoding process, however, the remote modem usually disconnects. Thus, the remote modem must be redialed to reestablish and continue the data session.

If the local modem does not attempt to decode the caller ID, the call waiting signaling will, at a minimum, interfere with ongoing communication and may cause the modems to hang up or retrain. Thus, the telephone switching network provides a mechanism for turning on and off the call waiting service. Before beginning the modem to modem data session, the call waiting service is turned off for the duration of the session. However, doing so prevents a user from receiving any other incoming calls on a shared telephone line. As a result, users are forced to add dedicated telephone lines for each type of telephony device in their premises.

56 kbps modems are now standardized in accordance with the ITU V.90 Recommendation. However, many 56 kbps modems, particularly end user modems, may only be compatible with legacy modes such as K56flex, V.34, V.FC, and V.32. Such legacy modems, and downwardly compatible V.90 modems, may have an undesirably long connect or initialization time between dial-up and full rate data mode. The startup time can be up to 30 seconds, which can be rather annoying and unattractive from the perspective of the end user, especially in light of other data communication protocols that appear to operate in an "always connected" manner.

V.90 modems that support legacy modem protocols typically perform the functions shown in Table 1 during initialization. The time periods associated with the operations set forth in Table 1 may vary from connection to connection depending upon various factors such as the server speed and channel conditions.

TABLE 1

Conventional V.90 Modem Startup

| PROTOCOL | OPERATION | TIME (seconds) |
| --- | --- | --- |
| — | Dialing | 1 |
| — | Call Establishment | 1 |
| V.8bis | Capabilities Exchange | 3.5 |
| V.8 | Capabilities Exchange | 3.5 |
| V.90 Phase 2 | Probing & Ranging | 1.5 |
| V.90 Phase 3 | Digital Impairment Learning; Initial APCM Training | 8.5 |
| V.90 Phase 4 | Final APCM Training; Set Power Levels; Constellation Transmission | 2.5 |
| V.42/V.42bis | Error Correction; Data Compression | 0.5 |
| — | Login | 0.5-5 |
|  | TOTAL = | 22.5-27.0 |

The V.8bis operation includes a relatively long timeout period that encompasses much of the time period associated with the operation. This operation is described in detail in ITU-T Recommendation V.8bis (International Telecommunication Union, August 1996), the content of which is incorporated by reference herein. The V.8bis protocol is an extension of the V.8 protocol, as described in ITU-T Recommendation V.8 (International Telecommunication Union, February 1998), the content of which is incorporated by reference herein. In accordance with V.8bis and/or V.8, the two modem devices exchange their individual capabilities such that compatible protocols may be utilized during subsequent initialization and data communication procedures.

The various V.90 startup phases are utilized to determine the analog and digital channel characteristics, to train the modem equalizers, and to otherwise attempt to optimize the current communication session. The details of the V.90 startup phases and other aspects of a V.90 modem system may be found in ITU-T Recommendation V.90 (International Telecommunication Union, September 1998), the content of which is incorporated by reference herein. Although a portion of the V.90 startup segments shown in Table 1 are required without regard to the location or status of the client modem, many of the operations could be eliminated or shortened upon repeated connections associated with the same (or nearly identical) channel characteristics.

In a conventional V.90 modem system, error correction and data compression techniques are performed during the V.42/

V.42bis stage. The specifics of V.42 are contained in ITU-T Recommendation V.42 (International Telecommunication Union, October 1996), the content of which is incorporated by reference herein. The specifics of V.42bis are contained in ITU-T Recommendation V.42bis (International Telecommunication Union, January 1990), the content of which is incorporated by reference herein. The V.42 operation is desirable such that the modem system can perform the login procedure in a substantially "error free" mode. The login procedure may be conducted with CHAP and PAP protocols; both are utilized for security purposes in the context of point-to-point protocol ("PPP") connections, e.g., a connection between a client computer and an internet service provider server. From the perspective of the V.90 modem devices, the login information is transmitted as data. Once the login procedure is performed, the dial-up connection is complete and data may be transmitted between the server and the host software associated with the client.

The widespread use of the internet as a daily research, entertainment, and communication tool has increased the deployment of 56 kbps modems. However, many channels can only support legacy modes such as V.34. Thus, although most newer modems (particularly those sold with new personal computers) are compatible with the V.90 Recommendation, many legacy modes are still in use. The long initialization period associated with V.90 modems that fall back into legacy modes may be annoying and undesirable in many applications and can be a serious hindrance where a user would like to establish an immediate connection after an unanticipated disconnect. In addition, even in the context of a connection between two V.90 modem devices, the long V.90 startup phases may test the mettle of an impatient end user. Accordingly, it would be highly desirable to reduce the initialization time normally associated with a conventional V.90 modem system.

A given modem communication session may be interrupted or disconnected for any number of reasons. For example, a call waiting signal may disrupt a modem connection to the extent that the modem call must either be reconnected or reinitialized. As another example, it may be possible to place a current modem connection on hold to enable the user to answer an incoming call in response to a call waiting signal or to enable the user to place an outgoing call without disconnecting the modem connection. Ideally, the modem connection could be re-established in an instantaneous manner. However, in a practical system, a retraining or reinitialization procedure must be carried out to ensure that the two end devices are properly synchronized and to ensure that the channel is adequately equalized. As discussed above, conventional V.90 modem systems may spend more than 20 seconds during such retraining and reinitialization. Accordingly, it would also be desirable to reduce the reconnection time between the same modem devices in response to a temporary disconnect or a temporary pause in the data communication.

Further disadvantages of the related art will become apparent to one skilled in the art through comparison of the related art with the drawings and the remainder of the specification.

SUMMARY OF THE INVENTION

Various aspects of the present invention can be found in a communication system having a telephone network that delivers call waiting signaling upon detecting an incoming call. The communication system comprising a remote modem and a local modem communicatively coupled thereto. The local modem, which shares access to the telephone network, detects call waiting signaling and directs the remote modem to enter a hold mode then temporarily relinquishes access to the telephone network.

The local modem may also perform caller identification processing during this process. If so, the caller identification information may be used to determine whether to service incoming calls. Making such determination may involve providing a user interface, or may be performed automatically by a computer coupled to the local modem.

Although unnecessary, the remote modem may remain in the hold mode for no longer than a predetermined interval. Other variations are also possible. For example, the local modem may use a v.42 protocol to set up a secondary channel for signaling the remote modem regarding the hold mode. A table might be used that stores pre-selected caller identification information for comparison with caller identification information associated with incoming calls. Such comparison may be used to determine whether to service incoming calls.

The remote and local modems attempt to maintain the communication session set up between the device housing the remote modem and the device housing the local modem. The remote modem must maintain the appearance of a connection to the upper layer protocols even though the connection to the local modem has been temporarily removed. Similarly, the local modem must maintain the appearance of the connection to the networking protocols using the communication capabilities of the local modem. To carry this out, the remote modem may communicate with upper protocol layers of the network connection with manufactured data while in the hold mode. The local modem similarly maintains the appearance of a network connection with the application requiring the data by manufacturing data and presenting it to the network stack while the two modems are on hold.

These and other aspects of the present invention may also be found in a communication system comprising a local link, a telephony device, a remote and a local modem. Therein, the telephony device is coupled to the local link and may access the link when it is relinquished by the local modem. Specifically, the local modem establishes -a data session with the remote modem by dialing a telephone number associated with the remote modem. After detecting a need to relinquish the local link to the telephony device, the local modem directs the remote modern to maintain the data session and temporarily relinquishes the local link to the telephony device.

The local modem may reestablish the data session without redialing the associated telephone number. Further variations are also possible. For example, the local modem may identify the need to relinquish the local link to the telephony device by detecting: a) call waiting signaling, b) a user initiated request, or c) a request that is automatically generated by a computer coupled to the local modem. Three-way calling and call waiting services are used to support the telephony device.

Yet other aspects of the present invention will become apparent through reference to the remainder of the specification including the claims set forth herein.

The present invention provides techniques to shorten the startup and reconnection times associated with a data communication system that employs a modem. The quick reconnect technique leverages the known channel characteristics of a previous connection to reduce the reinitialization period associated with subsequent attempts to reconnect the same two modem devices. In accordance with one illustrative embodiment, the techniques of the present invention are utilized to reduce the reconnection time for a communication session that follows an upper layer protocol, e.g., PPP.

Although not limited to any specific modem application, the quick startup and reconnect procedures may be used to eliminate portions of the initialization protocols or processes normally employed by a V.90 modem, e.g., V.8bis, V.8, digital impairment learning, initial training, probing and ranging, or the like. In addition, the quick startup and reconnect techniques may perform certain operations at a different time or in a different order in comparison to a conventional modem startup technique.

The above and other aspects of the present invention may be carried out in one form by a method for reducing the reconnection time associated with a data transmission system having a first device configured to communicate with a second device over a communication channel. The illustrative method involves establishing a communication session between the first device and the second device over the communication channel, obtaining a number of operating parameters for the data transmission system, where the operating parameters are associated with the communication channel, and storing at least one of the operating parameters at the second device. After a temporary pause in the communication session, the operating parameters are recalled at the second device.

DETAILED DESCRIPTION OF DRAWINGS

The present invention may be described herein in terms of functional block components and various processing steps. It should be appreciated that such functional blocks may be realized by any number of hardware components configured to perform the specified functions. For example, the present invention may employ various integrated circuit components, e.g., memory elements, digital signal processing elements, logic elements, look-up tables, and the like, which may carry out a variety of functions under the control of one or more microprocessors or other control devices. In addition, those skilled in the art will appreciate that the present invention may be practiced in any number of data communication contexts and that the modem system described herein is merely one illustrative application for the invention. Further, it should be noted that the present invention may employ any number of conventional techniques for data transmission, signaling, signal processing and conditioning, and the like. Such general techniques that may be known to those skilled in the art are not described in detail herein.

It should be appreciated that the particular implementations shown and described herein are merely exemplary and are not intended to limit the scope of the present invention in any way. Indeed, for the sake of brevity, conventional encoding and decoding, timing recovery, automatic gain control ("AGC"), synchronization, training, and other functional aspects of the data communication system (and components of the individual operating components of the system) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical communication system.

Figure 1:
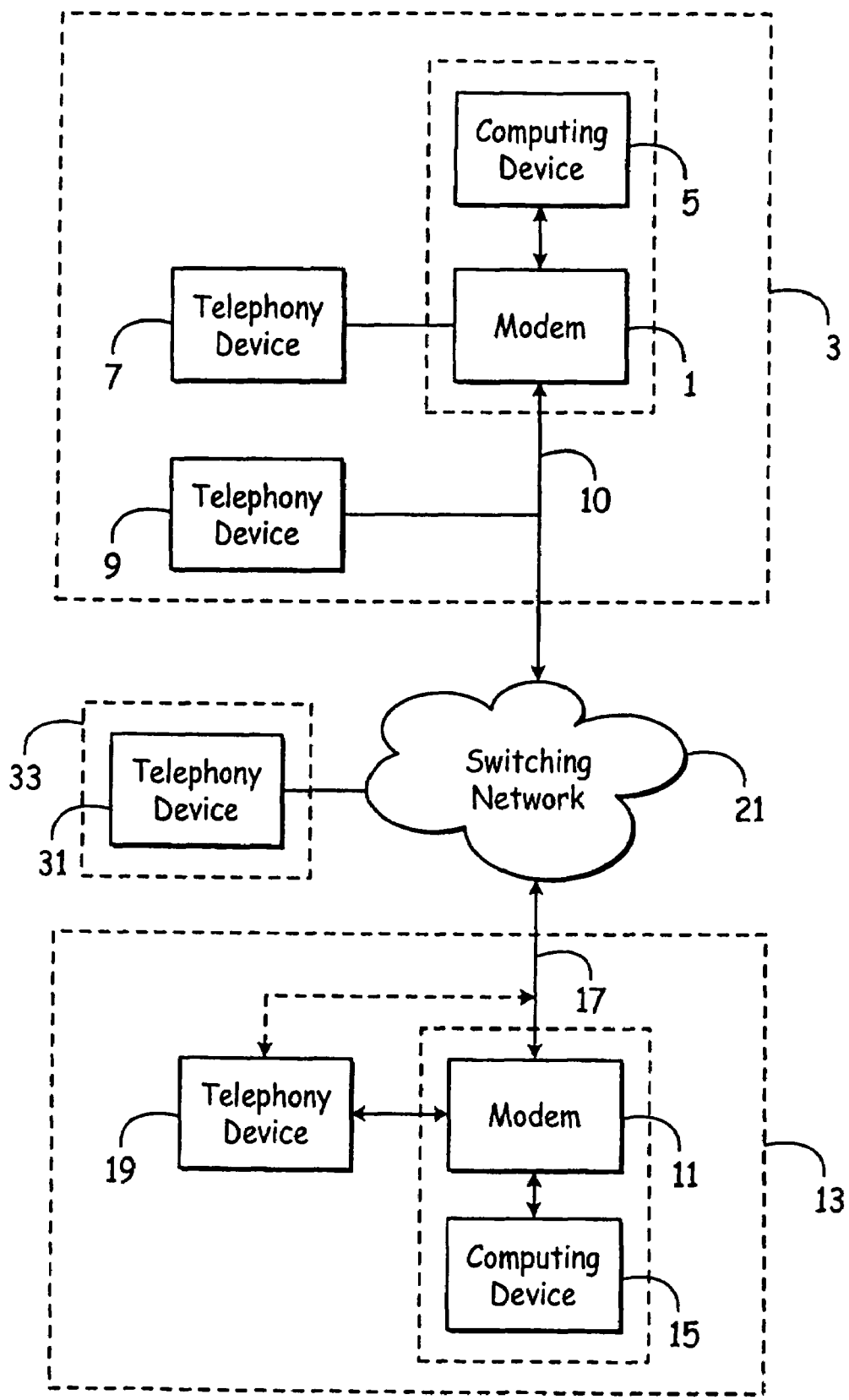
FIG. 1 is a block diagram illustrating an exemplary modem to modem communication network supporting three-way calling, call waiting and caller ID in accordance with various aspects of the present invention.

FIG. 1 is a block diagram illustrating an exemplary modem to modem communication network supporting three-way calling, call waiting and caller ID in accordance with various aspects of the present invention. In particular, a modem 1 at a premises 3 establishes and maintains ongoing communication with a modem 11 at a premises 13 via a switching network 21. If either the modem 1 or the modem 11 detect a need to temporarily relinquish a telephone line 10 or a telephone line 17, respectively, such modem (local modem) communicates to the other (remote modem) a request to hold for a predetermined period of time. If accepted, the remote modem places itself on hold, awaiting either: (a) reestablishment of communication from the local modem, or (b) a time out of the predetermined period of time. After placing the remote modem on hold, the local modem will relinquish or at least offer to relinquish the telephone line 10 or 17. Thereafter, when the telephone line 10 or 17 becomes available, the local modem will automatically reestablish communication with the remote modem. If the predetermined period of time has lapsed, the local modem will automatically call the remote modem. Otherwise, the local modem will reestablish communication by merely accessing the remote modem and engaging in a fast training sequence before carrying on where the modems 1 and 11 left off.

Either of the modems 1 and 11 can determine the need to relinquish their corresponding telephone lines 10 and 17 by (a) receiving call waiting signaling from the switching network 21, (b) detecting a local extension off hook, (c) receiving user input via computing devices 5 or 15, and (d) detecting a need from the associated computing device 5 or 15. When, for example, the modem 1 receives call waiting signaling from the switching network 21 (due to an incoming call from a telephony device 31 at a premises 33), the modem 1 communicates a request to hold to the modem 11.

If the modem 11 honors the request, the modem 11 begins waiting for reestablishment of the data session by the modem 1 for a first predetermined period (e.g., 30 seconds), and the modem I interacts with the switching network 21 to retrieve the caller ID information (if configured to do so) and presents an indication of the incoming call, along with caller ID information if employed, via a screen (not shown) on the computing device 5. The computing device 5 may signal a user by simulating a ring signal and delivering a pop-up window containing the caller ID information.

If the user fails to accept the incoming call or rejects such call, the modem I will reestablish communication with modem 11 before the first predetermined period lapses. If however the user wants to take the call, the user interacts to accept the call via the computing device 5. The modem 1 responds by communicating a second predetermined hold period (e.g., 30 minutes) to the modem 11 and then "flashes" the telephone line 10. The switching network 21 responds by connecting the incoming call to the telephone line 10. Thereafter, the user is free to use a telephony device 7 or 9, e.g., a telephone, facsimile machine, answering machine, etc., to service the incoming call. When the telephony device 7 or 9 hangs up, the modem 1 "flashes" the telephone line 10. The switching network 21 again communicatively couples the telephone lines 10 and 17, and the modem 1 reestablishes communication with the modem 11. Alternatively, if the telephony device 31 disconnects prior to the modem 1 "flashing," the switching network 21 again communicatively couples the telephone lines 10 and 17, and the modem 1 reestablishes communication with the modem 11. Had the first predetermined time period lapsed before the second predetermined period was communicated or had the second predetermined time period lapsed before the modem 1 reestablished communication, the modem 1 would automatically dial or redial the modem 11 to reestablish the link.

Instead of or in addition to signaling a user via the computing device 105, the modem 1 may also deliver a ring signal or other such indication directly to the attached telephony device 7 or to the locally connected telephone device 9 via the telephone line 10. The modem 11 performs similar functionality in its interaction with the computing device 15 and the telephony device 19 when receiving an incoming call via call waiting services.

The modem 11 may also detect the need to relinquish the telephone line 10 by detecting a local extension off hook event from either the telephony device 7 or 9. For example, when the telephony device 7 happens to comprise a telephone, the modem 1 detects when a user lifts the receiver of the telephony device 7 and, in response, communicates a hold request to the modem 11 and establishes a three-way call dial tone through interaction with the switching network 21. The user may then establish an outgoing call. When the telephony device 7 hangs up, the modem 1 using the three-way calling service features reestablishes the link via the switching network 21 to the modem 11 without having to redial.

A user may also interact via the computing device 5 to request gaining access to the telephone line 10. For example, the user may desire to send a fax from a telephony device 9. The modem 1 responds to such a request by establishing a hold condition with the modem 11 and using three-way calling functionality to gain a dial tone on the telephone line 10. Thereafter, the modem 1 communicates via the computing device to the user that the telephone line 10 is free for use by the telephony device 9. When the telephony device 9 disconnects or the remote side disconnects, the modem 1 again can reestablish the communication link with the modem 11 without having to redial.

Similar functionality also occurs automatically without user interaction. For example, a computing device 5 may periodically gain access to the telephony device 31 to service a communication exchange with the telephony device 31.

In addition, the modem 1 may place the modem 11 on hold to permit the telephony device 7 or 9 to communicate with the telephony device 19. In this way, the primary communication link between the modems 1 and 11 might be used to set up the secondary communication link between the telephony devices 7 or 9 and 19.

The switching network 21 may comprise one or more central offices (COs) interconnected by a toll network. The telephone lines 10 or 17 may comprise twisted pair, cable, fiber and/or wireless links, for example.

The modem 1 and the computing device 5 may be separate or integrated. Similarly, the modem 11 may be internal to the computing device 15 or external.

Figure 2:
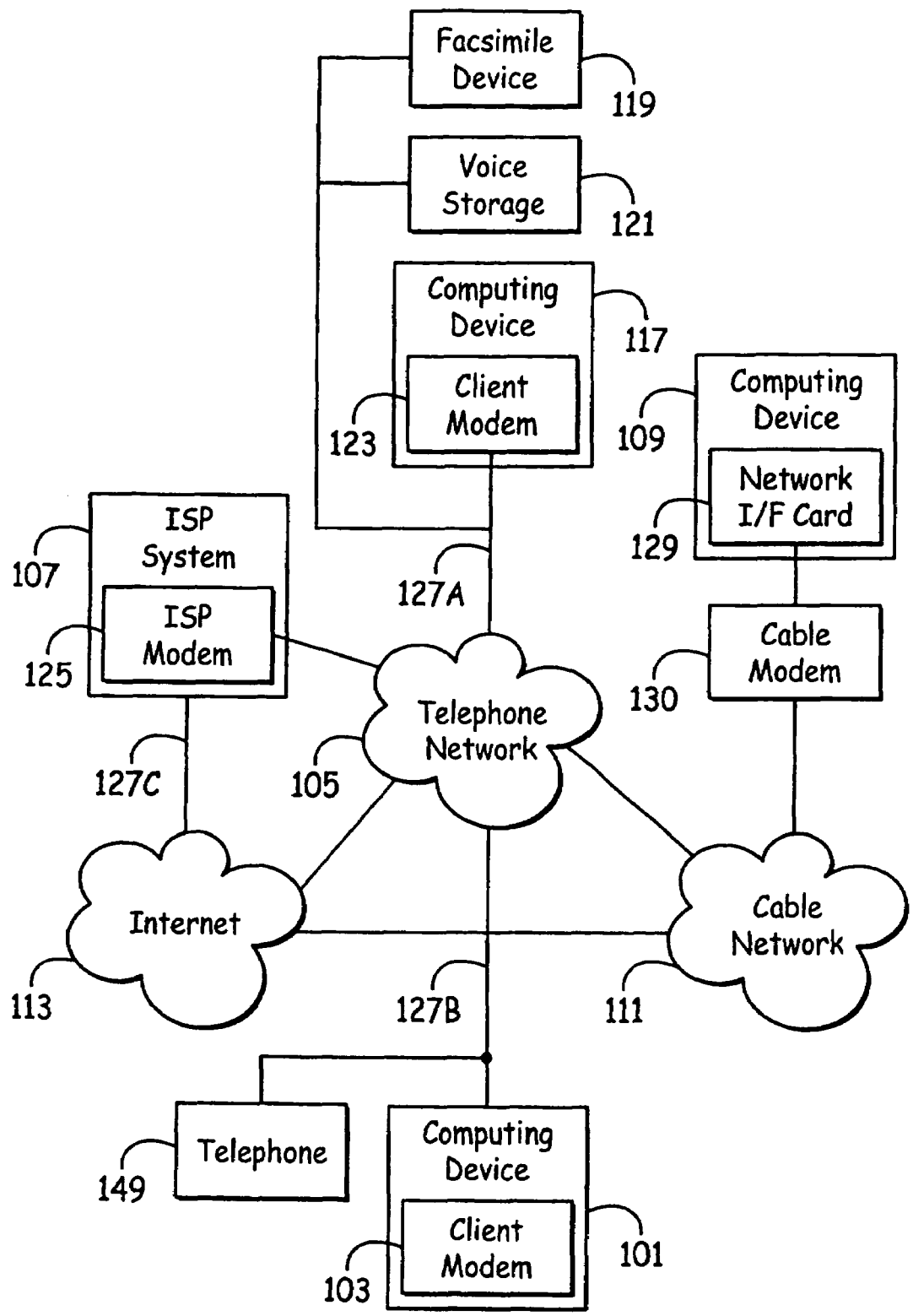
FIG. 2 is an exemplary schematic diagram of an Internet based communication system build in accordance with the present invention utilizing the functionality described in FIG. 1.

FIG. 2 is an exemplary schematic diagram of an Internet based communication system built in accordance with the present invention utilizing the functionality described in FIG. 1. More specifically, a client modem 103 that services a client computer 101 establishes and maintains a data connection with an ISP (Internet Service Provider) modem 125 of an ISP computing system 107.

A user wishing to establish the data session between the client computer 101 and the Internet 113, employs client modem 103 that dials through a telephone network 105 to an ISP modem 125. The ISP modem 125 provides access to the ISP 107 that participates via a link 127C on the Internet 113.

During the existence of the data communication link, the telephone network 105 may receive a telephone call from, for example, a telephone 119. In response, the telephone network 105 delivers call waiting signals to the client modem 103. On detecting a call waiting tone, the client modem 103 signals the ISP modem 125 regarding the presence of caller identification. In one embodiment, the client modem instructs the ISP modem 125 to maintain the communication link for a first predetermined period of time. In another, the ISP modem 125 either will wait indefinitely or will have a preset predetermined period which need not be communicated. The client modem 103 next coordinates with the telephone network 105 to receive and decode the caller identification. The caller identification is forwarded to the user via a display on the client modem 103 (if external), and/or on the client computer 101. In turn, based on the caller identification, the user determines whether to terminate the existing data session or ignore the incoming telephone call and return to the existing data session, all within the first predetermined period. If the user fails to act or chooses to reject the incoming call, the client modem 103 will reestablish communication with the ISP modem 125. If the user chooses to accept the call, and if the first predetermined period is not long enough, the client modem 103 will communicate a second predetermined period, e.g., 30 minutes, to the ISP modem 125. Thereafter, the client modem 103 "flashes" the telephone network and signals the user via the client computer 101 as previously discussed and/or, if so configured, via the line 127. The telephone network 105 responds by connecting the incoming call to a line 127. The user may then employ a facsimile device 119 or a voice mail or voice storage system 121, for example, to service the incoming call.

The ISP modem 125 may also be placed on hold by the client computer 101, either through manual user interaction or automatically to meet a need that arises. For example, a user may desire to use the telephone 149 during an ongoing session between the ISP modem 125 and the client modem 203. The user interacts via a window on the computing device 101 to place such request. In response, the computing device 101 directs the client modem 103 to place the session on hold.

As before, the client modem 103 communicates a hold request to the ISP modem 125 which may choose to honor the request. If refused, the connection is terminated. If honored, the ISP modem 125 is placed on hold, and the telephone network 105 is signaled to begin three-way calling services. The telephone network 105 provides a dial tone and the client modem 103 directs the computing device 101 to display a ready indication. Thereafter, the user may employ the telephone 149 to place the call.

All other modes of employing three-way calling and call waiting services described in reference to FIG. 1 are also possible. In all cases, the ISP modem 125 and the client modem 123 both communicate with upper layers of the protocol stack to ensure that the session is maintained. Thus, even though the session is actually placed on hold, neither the application software nor the higher protocol stack layers need to be aware of such condition, even though they might be modified to do so.

A point to point data session may exist between the client computer 101 and a computer 117. The data session is established after a modem handshake following a dial up routine between the client modem 103 and a modem 123. Caller ID information/call waiting and three-way calling functionality are similarly processed as referenced above.

Additional features of the client modem 103 permits the direction of both faxes received from a fax modem 121 and voice mail received from a voice storage 119. A client computer 109 is connected to the Internet 113 via a cable network 111. A cable modem 130A enables the connection of the client computer 109 and the Internet 113 connectivity and further constitutes part of a communication network 100.

Communication links 127A and 127B couple the client modems 103 and 123 with the telephone network 105. The communication links 127A and 127B comprise twisted pair wiring but may also or alternatively comprise a radio communication link, for example, or may be ISDN, ADSL, or DSL, for example.

Cable modems may be employed which utilize similar functionality. Specifically, a cable modem 130 couples with a computing device 109 via a network interface card 129. A computing device 101 may directly couple with the cable modem 130 via the telephone network 105 and the cable network 111. If a need arises to relinquish the line 127B, e.g., an incoming call is detected by the computing device 101. The computing device 101 sends a hold request to the cable modem 130 which, in turn, "spots" the upper layers of its protocol stack to act like the session is ongoing and begins waiting. As before, the client modem 103 relinquishes the link 127B to servicing the need and, when completed, the client modem 103 reestablishes the session with the cable modem 130 without having to redial.

In a further embodiment, a CO within the telephone network 105 provides an "attention signal" to both the client modem 103 and the ISP modem 125 when, for example, the client modem 103 and the ISP modem 125 are engaged in ongoing communication. The "attention signal" would convey a pending request to at least temporarily change the "ownership" of the telephone line 127B. In such an embodiment, the client modem 103 need not inform the ISP modem 125 that it is considering relinquishing the telephone line 127B.

The CO within the telephone network has been modified to deliver a dial tone while not dropping the second line. Thus, when the client modem 103 detects an extension-off hook condition, e.g., the telephone 149 is picked up, the client modem 101 first signals the ISP modem 125 to go into a hold mode. Next, the client modem 103 requests that the CO generate a dial tone and relinquishes the line to the telephone 149.

In such embodiments as well as the other described herein, call waiting indications, with or without caller ID services are "attention signals." Attention signals are those signals that convey to a modem that a request for another use for a shared telephone line is present. Another example beyond call waiting might be an operator's manual attempts to interrupt an ongoing session in emergency situations. In most embodiments, attention signals are delivered only to the modem whose line is to be shared, yet, as described above, need not be the case. Such attention signals can also be delivered to all parties and modems or telephony devices participating in an ongoing communication exchange.

Additionally, the ISP modem 125 might send a hold request to the client modem 103. While the client modem 103 is on hold, the ISP 107 can change the routing of the ISP modem 125, substitute another ISP modem automatically (for example when ISP modem 125 is having problems or is not optional for the client modem 103), etc. This may all happen without ever relinquishing any telephone link.

The aforementioned functionality also supports Internet browser interoperability. For example, when interacting with a browser running on the computing device 101 to surf the Internet, a user may encounter a telephone number on a web page that they would like to call. By selecting a "place call" button on the browser, the computing device 101 delivers an "attention signal" to the client modem 103 which, in turn, places itself and the ISP modem 125 in a hold mode. Before entering the hold mode, the client modem 103 may also dial the number and if so configured and pursuant to meta information provided in the web page, may interact with the answering party or system to assist the user in reaching a desired location within the receiving party's answering system. Whether or not such additional services are provided by the client modem 103, the computing device 101 then delivers a signal to the user to pick up the telephone 149.

Figure 3:
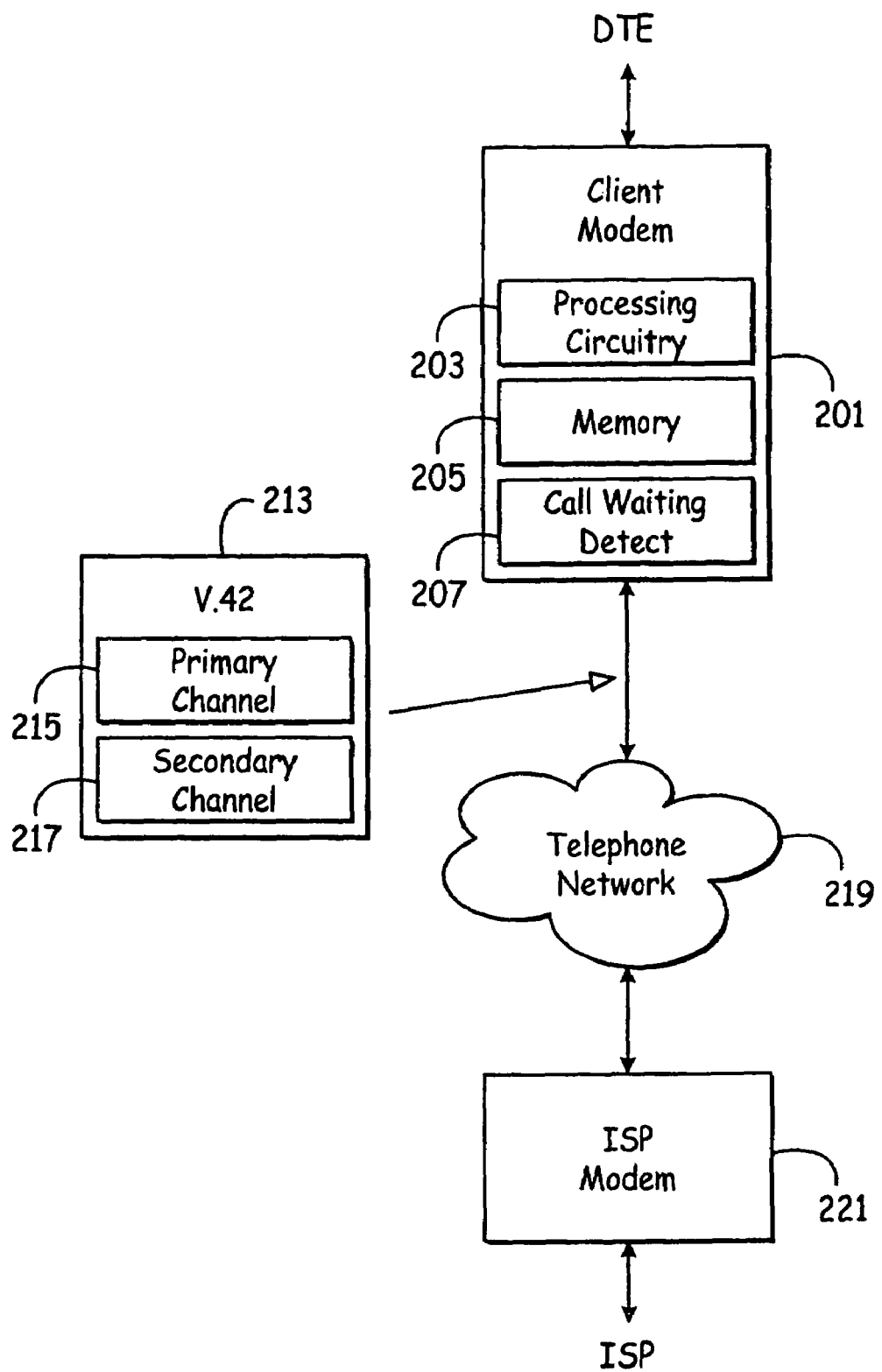
FIG. 3 is an exemplary embodiment of the communication system of FIG. 2, illustrating DCE signaling of an ISP to make the ISP caller ID aware.

FIG. 3 is an exemplary embodiment of the communication system of FIG. 2, illustrating DCE signaling of an ISP to make the ISP caller ID aware. More specifically, using a secondary channel 217, a client modem 201 signals an ISP modem 221 to make the ISP modem 221 aware when a call waiting signaling is received.

A user utilizing the client modem 201 engages in a data session on a primary channel 215 with an ISP modem 221 via a telephone network 219. When a call waiting tone is detected during the data session, call waiting detect circuitry 207 informs a processing circuitry 203 that an incoming telephone call has been detected. In response, the processing circuit 203 signals the ISP modem 221 informing of the call waiting event. The processing circuitry 203 then utilizes a secondary channel 217 to signal the ISP modem 221 to refrain from disconnecting while the ISP modem 221 decodes the received caller identification information. In response, the ISP modem 221 may choose to accept by transmitting an acknowledgment signal.

After receiving the acknowledgement, the processing circuitry 203 performs caller ID processing to retrieve the caller ID information from the telephone network 219. Specifically, the processing circuitry 201 transmits a DTMF tone to a central office (CO) within the telephone network directing that the caller ID information be forwarded. The CO then transmits a Bell 211 signal having the caller ID information (while muting the data session line connected to the ISP modem 221). The processing circuit switches from its current protocol, typically V.90 to the Bell 212 mode and receives the caller ID information. The caller ID information is presented to the user through a LCD display within the client modem 201 or through a pop-up window generated by the user's software, for example, and requesting whether the user wishes to accept or reject the incoming call.

In one embodiment, if the user accepts the incoming call, the ISP modem 221 retains the data session connection for a predetermined time while the client modem 201 is engaged with the incoming call. On returning, the client modem 201 resynchronization with the ISP modem 221 to continue the prior data session, that is, the client modem 201 and the ISP modem 221 go through timing synchronization, train echo cancellers and transmit known signal conditions, for example. If after the expiration of the predetermined interval, the client modem 201 fails to return, the data connection is terminated.

In an alternate embodiment, the user may accept the incoming call while the ISP modem 221 is instructed to idle. When the client modem 201 returns, a fast resynchronization algorithm is used to re-establish communication more rapid because prior line conditions are known, and both modems need not go through full retraining. Further detail regarding "resynchronization" can be found in U.S. patent application Ser. No. 09/361,842 (filed Jul. 27, 1999) and entitled "Method and Apparatus for Fast V90 Modem Startup," and U.S. application Ser. No. 09/394,018 (filed Sep. 10, 1999) and entitled "Method and Apparatus for Quick Modem Reconnect." These applications are hereby incorporated herein by reference in their entirety.

Another functionality previously described with reference to FIGS. 1-2 also apply for interactions between the client modem 201 and the ISP modem 221. In addition, the client modem 201 may employ a look up table as further referenced in FIG. 5 to determine how and whether to service an incoming call.

The secondary channel 217 is a virtual channel set up using the V.42 protocol. This is a proprietary mode in which both the client modem 201 and the ISP modem 221 communicate their capabilities and exchange information through the secondary channel 217. The processing circuitry 203 employs software, hardware and firmware to direct and synchronize various tasks relating to the client modem 201. Although described in reference to ISP communication, such functionality also applies outside of that context.

Figure 4:
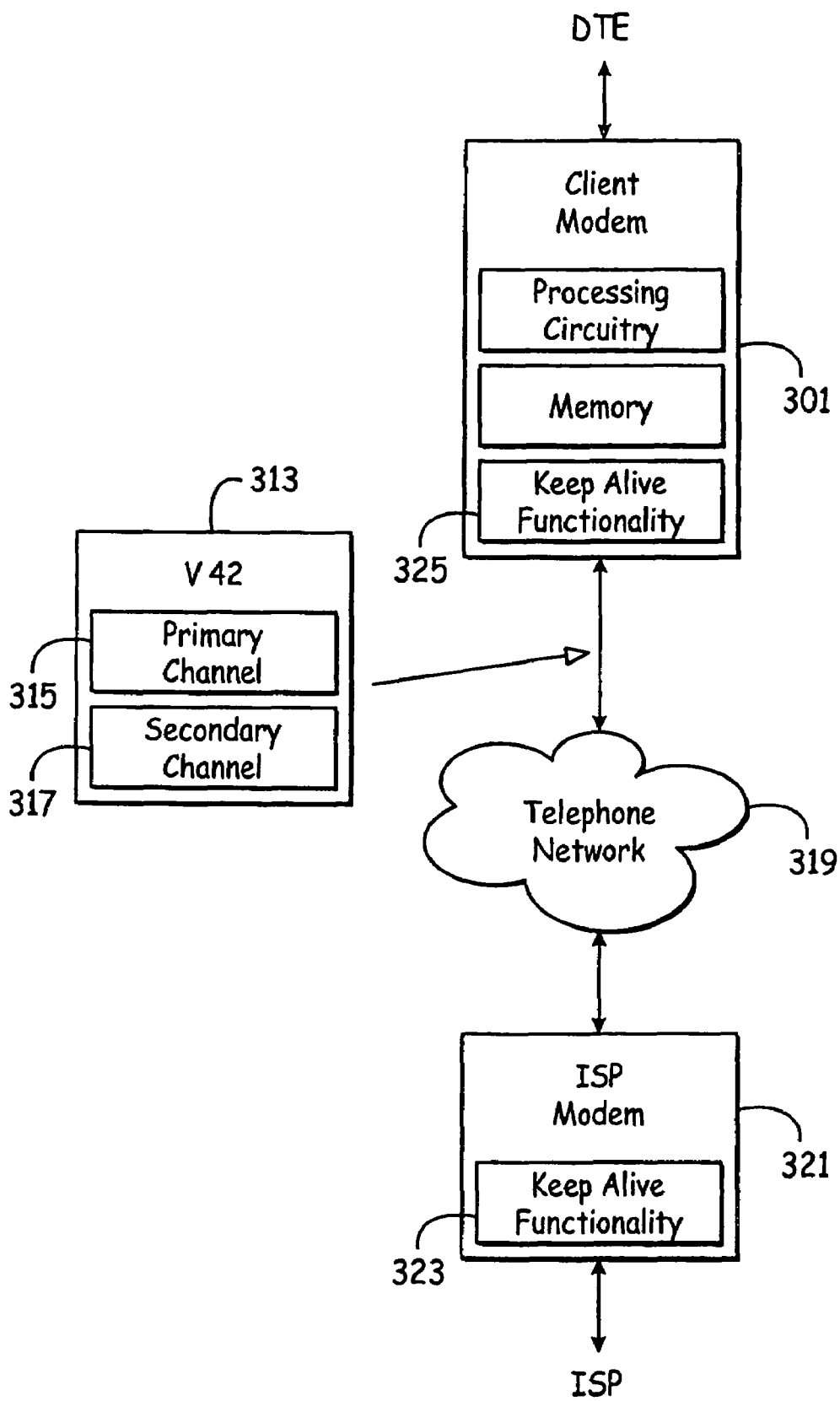
FIG. 4 is an alternate exemplary embodiment of the communication system of FIG. 3 that employs keep alive functionality to maintain continuous data session.

FIG. 4 is an alternate exemplary embodiment of the communication system of FIG. 3 that employs keep alive functionality to maintain continuous data session. Specifically, the ISP modem 321 employs a keep alive function 323 which delivers "keep alive packets" to higher protocol whether or not the client modem 301 sends a hold request.

Particularly, there are several layers of protocol involved in the connection between a user's Internet browser, for example and an ISP, and these layers have to be "kept alive" while the client modem 301 relinquishes a link 331 for call waiting services or otherwise. During a data session, while the client modem 301 has relinquished the link 331, the higher protocol layer, for example, TCP/IP, may encounter a time out condition and terminate the data session.

To achieve a continuous data session, when caller ID is received, the bottom two layers namely, the physical and the data link layer, responsible for transmission, framing, and error control of the communications link may be modified. In one embodiment, the keep alive functionality 323 within the ISP modem 321 transmits "keep alive" packet streams to the higher TCP/IP protocol layer after the modem signal is interrupted. This deceives the higher TCP/IP layers and prevents the session from terminating. The "keep alive" packet stream may be either data bits or control signals or both, and located within the client modem 301, the ISP modem 321 or both.

Again, the keep alive stream need not require a hold request to be used. In fact, in one embodiment, the ISP modem uses the keep alive whenever it is having difficulty reaching the client modem 301 for whatever reason. The stream is used for a predetermined period to allow reestablishment of the link during a period that far needs a traditional session termination period.

Figure 5:
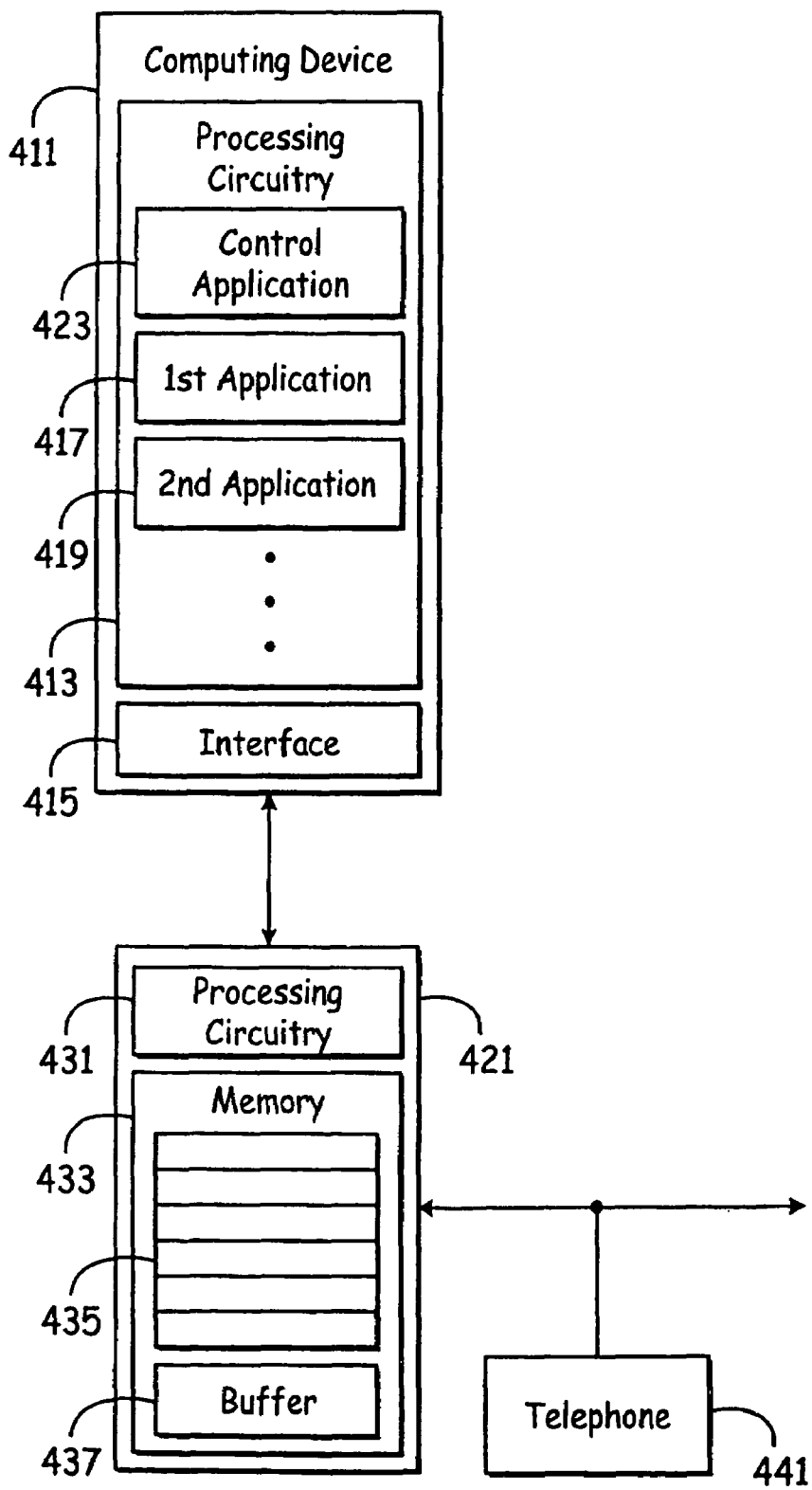
FIG. 5 is a schematic diagram of a computing device 411 coupled to a modem 421 having a memory look up table, according to the present invention, and permitting call classification and functional assignment prior to forwarding caller ID information to the computing device 411.

FIG. 5 is a schematic diagram of a computing device 411 coupled to a modem 421 having a memory look up table, according to the present invention, and permitting call classification and functional assignment prior to forwarding caller ID information to the computing device 411. The computing device 411 comprises a processing circuit 413 and other conventional circuitry such as an interface circuit 415.

The processing circuit 413 operates pursuant to a plurality of applications (e.g., a first and second application 417 and 419) that independently service incoming calls via the modem 421. A control application 423 selectively interacts to launch the plurality of applications.

The modem 421 comprises a processing circuit 431 and a memory 433, among other circuitry. The modem 421 determines whether to forward the caller ID information to the computing device 411 based on a table 435 within the memory 433. The table 435 stores a series of caller ID cross reference entries. Thus, for example, upon detecting an incoming call, the modem 421 notifies an ISP modem (not shown) that it is about to interrupt the present modem connection to receive caller ID information. When the caller ID information is received, the processing circuit 431 stores the caller ID information in a buffer 437 and compares that information with the entries in the table 435.

If a match is found, the processing circuit 431 informs the ISP modem that delivers the buffered caller ID information to the computing device 411 to the control application 423 which, in turn, launches the appropriate application that has been designated to service the received caller ID information. The caller ID information may also be forwarded to such application.

If no match is found, the modem 421 will ignore the incoming call and continue the data session with the ISP modem. Thus, the modem 421 need not involve the computing device 411 or bother the user by forwarding caller ID information unless it has been assigned to do so via the entries in the table 435. In this embodiment, the:table is used to forward only those incoming calls that have a table entry. However, in alternate embodiments the table may be used to screen out matching incoming calls.

The user via computing device 411 loads the table 435 with, for example, telephone numbers of incoming calls to be processed by the first and second applications 417 and 419. In an exemplary embodiment, the first application 417 comprises facsimile processing software, while the second application 419 comprises data processing software. If facsimile transmissions are only to be received from a single telephone number, that telephone number is loaded into the table 435 of the modem 421, similarly, the telephone numbers from which data transmissions will be received are also loaded into the memory 435. When a facsimile transmission is received from the telephone number stored in the table 435, the processing circuitry 431 delivers the caller ID information to the computing device 411, and immediately switches to the facsimile transmission without user interference.

Thereafter, the control application 423 directs the first application 417 in handling the transmission. When the facsimile transmission is completed, the control application 423 cooperates with the modem 421 to return the user to the prior data session. When an incoming data transmission is received from a corresponding telephone number stored in the table 435, the processing circuit 431 delivers the caller identification to the computing device 411 for processing by the second application 419, for example. Calls from telephone numbers that are not contained in the table 435 may be ignored by the modem 421.

Alternatively, or in addition, the table may be loaded with caller ID information that identifies telephone numbers to be ignored and not answered by the DCE/DTE. For example, known voice telephone numbers may be ignored by the DCE 421 while all other non-tabled numbers would be answered by the DCE 421.

Thus, by screening and/or the selection of specific calls, the DCE is able to save time expended by the user in determining which telephone calls to accept. In addition, a single telephone line may be shared by a plurality of communication devices, such as the DCE 421 and other DCEs or telephones. Further, such screening and/or filtering may also be employed to remove unnecessary call processing burdens from an active DTE which may be engaged in other tasks. Thus, for example, the computing device 411 during a data session need not have to share processing resources to service calls not intended for the computing device 411.

Although the table 435 is shown to be stored within the modem 421, it might be alternatively be stored within the computing device 411. In such embodiments (not shown), the computing device 411 still automatically filters unwanted incoming calls.

Figure 6:
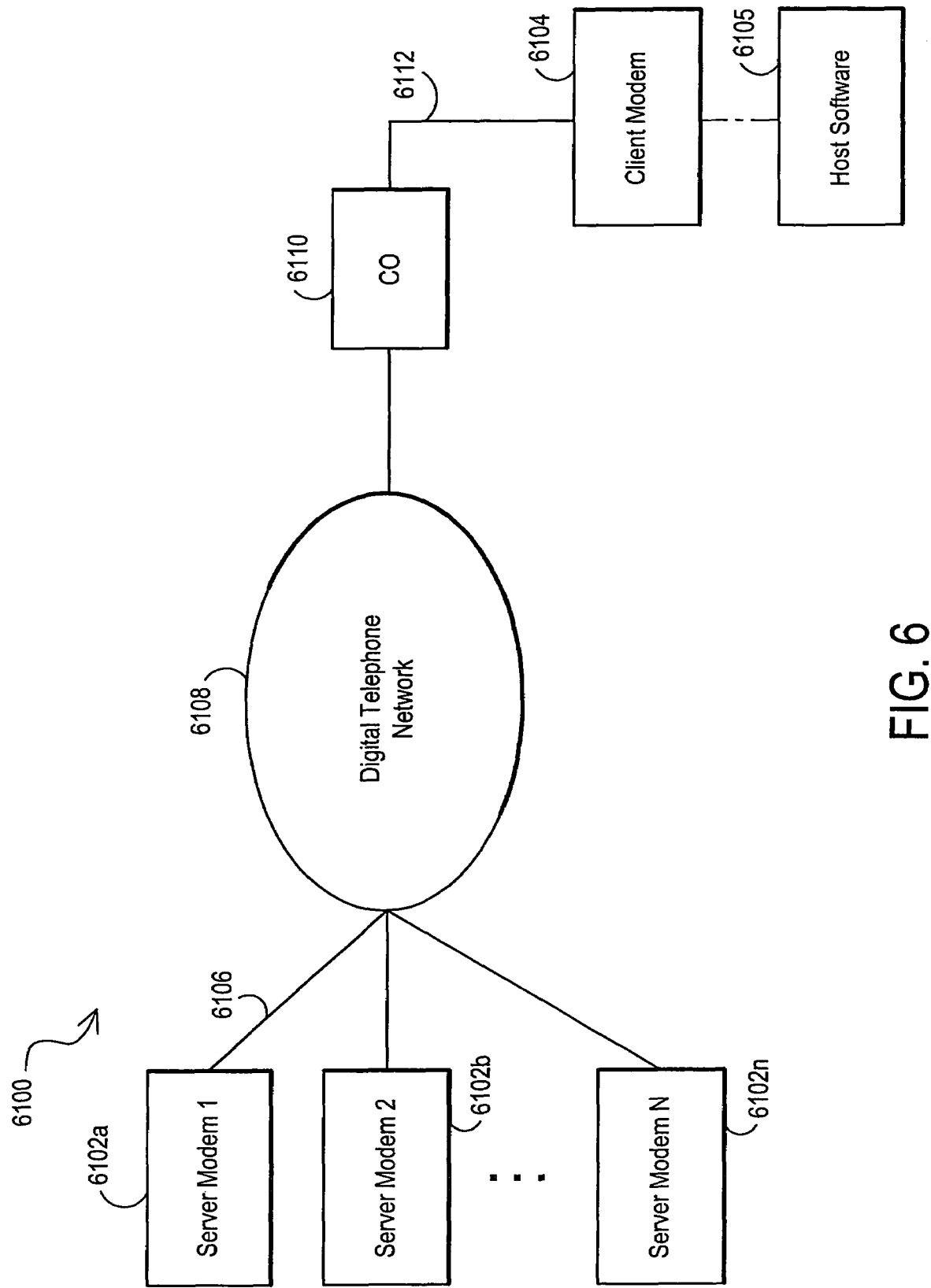
FIG. 6 is a block diagram depicting a general modem system environment capable of supporting point-to-point protocol ("PPP") connections.

FIG. 6 is a block diagram depicting a general modem system 6100 in which the techniques of the present invention may be practiced. For purposes of this description, modem system 6100 is assumed to be capable of supporting connections associated with an upper layer protocol, e.g., point-to-point protocol ("PPP") connections. PPP connections are typically associated with internet communications between, e.g., an individual end user and an internet service provider. In this respect, modem system 6100 includes a plurality of server modems (identified by reference numbers 6102a, 6102b, and 6102n) and a client modem 6104. Server modems 6102 may each be associated with an internet service provider or any suitable data source. Client modem 6104 may be associated with a suitable data source, e.g., a personal computer capable of running host software 6105. For purposes of this description, host software 6105 may be an operating system such as MICROSOFT WINDOWS, or any application program capable of functioning in conjunction with modem system 6100. Although not shown in FIG. 6, client modem 6104 may be integrated with the personal computer.

In the context of this description, modem system 6100 may employ 56 kbps modems that are compatible with the V.90 Recommendation, legacy 56 kbps protocols, the V.34 Recommendation, or the like. Although the present invention is described herein in the context of a V.90 modem system, the techniques can be equivalently applied in a V.34 modem system or in any number of legacy modem systems. V.90 or 56 kbps modem devices are suitable for use in modem system 6100 where a given server modem 102 utilizes a digital connection 6106 to the digital telephone network 6108. The client modem 6104 is connected to a local central office 6110 via an analog local loop 6112. Thus, the communication channel established between client modem 6104 and any server modem 6102 is digital up to the central office 6110. Thereafter, the digital signals are converted to an analog signal for transmission over the local loop 6112.

If an end user desires to establish an internet connection, host software 6105 may perform any number of operations in response to a user command. For example, host software 6105 may prompt client modem 6104 to dial the telephone number associated with server modem 6102a (which, for this example, is the server modem associated with the user's internet service provider). Server modem 6102a and client modem 6104 perform a handshaking routine that initializes the equalizers, echo cancelers, transmit power levels, data rate, and possibly other operational parameters associated with the current communication channel. In addition, host software 6105 may cause client modem 6104 to transmit and receive authentication data that enables the user to log onto the internet via the service provider. As mentioned above, the authentication data may be exchanged between server modem 6102a and client modem 6104 in accordance with the known CHAP or PAP techniques. In an alternate embodiment that employs a non-PPP upper layer protocol, a suitable login procedure may be conducted instead of the CHAP or PAP procedures.

As discussed previously, the dial-up connection time (and reconnection time) associated with conventional modem systems may be undesirably long. The present invention takes advantage of the repeated use of a communication channel between modem devices, e.g., the communication channel that is established between server modem 6102a and client modem 6104. Assuming that client modem 6104 is associated with a desktop personal computer resident at a specific location, the connection to any given server modem 6102 will necessarily be established over the same analog communication channel. In other words, client modem 6104 will always establish an analog channel between the user premises and central office 6110. Disregarding slight variations in the analog channel due to temperature and other environmental effects, the initialization of client modem 6104 (with respect to the analog channel) will remain substantially constant from connection to connection.

Figure 7:
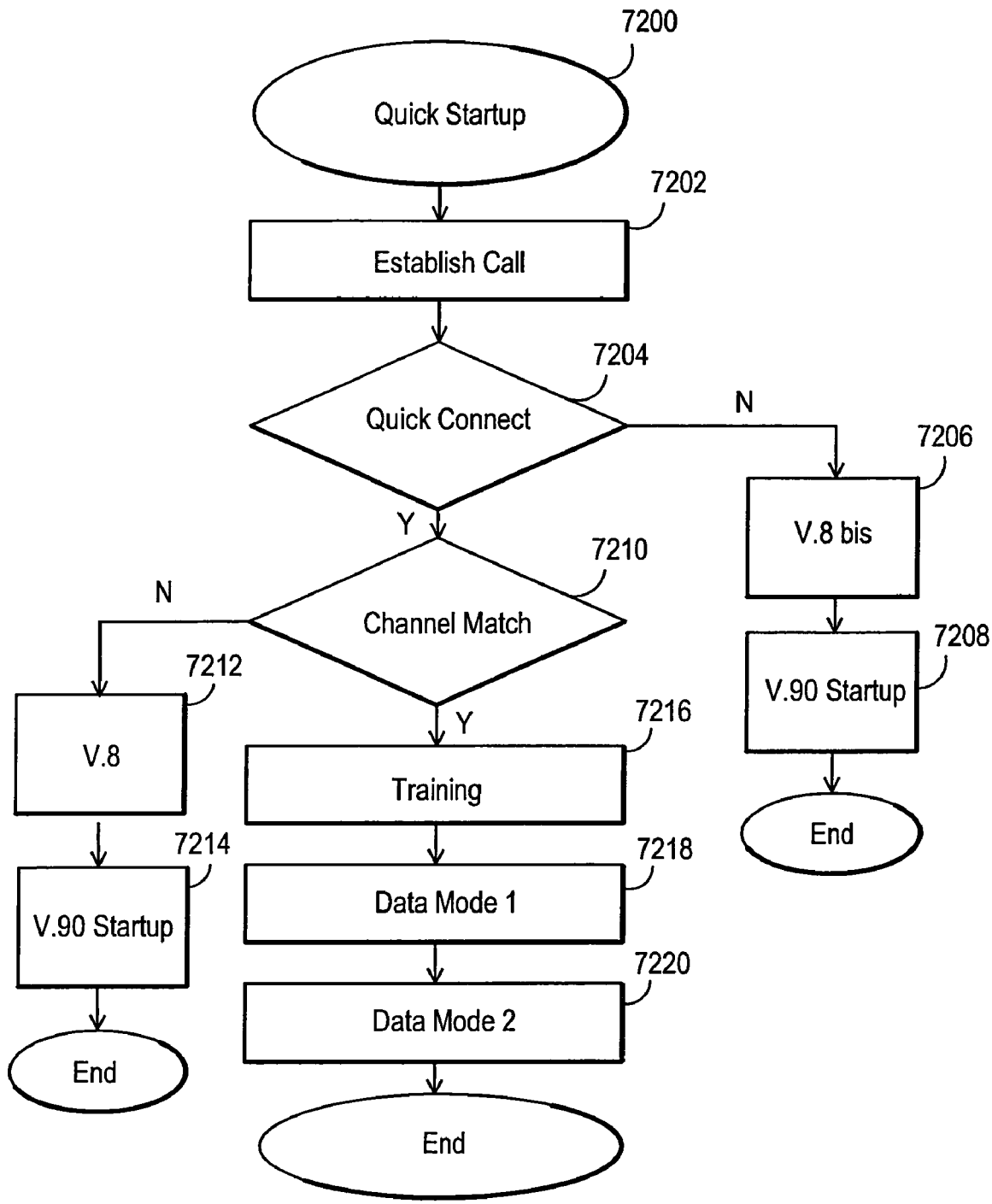
FIG. 7 is a flow diagram of a general quick startup process according to the present invention.

FIG. 7 is a flow diagram of a general quick startup process 7200 that may be performed by a data communication system such as modem system 6100. In a practical system, process 7200 may be cooperatively performed by server modem 6102, client modem 6104, host software 6105, and/or any functional component of modem system 6100. In addition, process 7200 may be realized in the context of an overall initialization procedure that follows any number of conventional modem protocols.

Quick startup process 7200 may begin with a task 7202, which relates to the establishment of a call between client modem 6104 and a server modem 6102. In the context of this example, client modem 6104 is considered to be the calling device. Accordingly, host software 6105 and/or client modem 6104 dials the telephone number associated with, e.g., server modem 6102b. Assuming that server modem 6102b is capable of making an additional connection, it will go off hook and generate a suitable answer tone in a conventional manner. When both modem devices are off hook and communicating with each other, a communication channel is established via digital connection 6106, telephone network 6108, central office 6110, and analog local loop 6112. The dialing, ringing, and answering procedures utilized during task 7202 may follow conventional protocols.

Following task 7202, a query task 7204 may be performed by modem system 6100 to ascertain whether a quick connect protocol is supported. Query task 7204 may be necessary to enable different server modems and different client modems to be interoperable and compatible. For example, server modem 6102b may be a V.90 modem device that supports the quick connect features of the present invention, while client modem 6104 may be a legacy 56 kbps modem device that does not support the quick connect features. Portions of query task 7204 may be performed by server modem 6102b or client modem 6104. An illustrative technique for performing query task 7204 is described in detail below. Task 7204 may be equivalently performed when client modem 6104 initiates the call or when server modem 6102 initiates the call.

If query task 7204 determines that the quick connect protocol is not supported by both modem devices, then a task 7206 may follow. Task 7206 prompts modem system 6100 to begin a conventional initialization routine. For example, in the context of a V.34 or V.90 modem system, task 7206 may begin a capabilities exchange protocol such as V.8bis. Alternatively, some modem systems may only implement the V.8 capabilities exchange protocol. Older legacy modem systems may skip the V.8 and V.8bis procedures altogether and perform an appropriate initialization routine according to the legacy mode. Following task 7206, modem system 6100 may conduct a known startup procedure in accordance with an applicable modem specification. For example, if modem system 6100 supports V.90, then task 7208 may be associated with conventional V.90 equalizer training, echo canceler training, constellation design, power level verification, and other startup operations. If tasks 7206 and 7208 are performed, then the startup time associated with the communication session is essentially the same as the startup time for a conventional V.90 connection.

If query task 7204 determines that the quick connect protocol is fully supported, then a query task 7210 may also be performed. Query task 7210 tests whether the characteristics of the established communication channel are similar to corresponding characteristics of a previously established communication channel. Briefly, query task 7210 compares one or more attributes of a received sequence to stored attributes of a previously received sequence associated with the previously established channel. The received signal conveys information regarding the characteristics of the communication channel. In particular, the received signal conveys information relative to analog local loop 6112.

In the illustrative embodiment described herein, where one modem device is connected digitally to the digital telephone network 6108, analog local loop 6112 affects signals in a substantially consistent manner from connection to connection. Although the analog characteristics will be similar for repeated connections to the same server modem 6102, slight variations in temperature, humidity, other environmental changes, physical changes in the system hardware, and other operational parameters contribute to random fluctuations in the current channel characteristics used for comparison purposes. Nonetheless, the comparison procedure performed during query task 7210 is preferably designed to accommodate such fluctuations. For purposes of this description, "similar" characteristics means that query task 7210 will assume that the current channel matches a previous channel notwithstanding normal variations due to the uncontrollable and unpredictable factors mentioned above.

If query task 7210 determines that the parameters of the current communication channel do not match the parameters of a previous communication channel, then a task 7212 may be performed. Task 7212, like task 7206, prompts modem system 6100 to begin a conventional initialization routine. In a preferred embodiment, if modem system 6100 verifies that the quick connect protocol is fully supported (query task 7204, then most, if not all, of the V.8bis procedure may be skipped. Accordingly, the V.8 capabilities exchange protocol may be prompted by task 7212. Thereafter, a task 7214 may be performed to cause modem system 6100 to enter the conventional V.90 startup procedure. Task 7214 is similar to task 7208 described above. If tasks 7212 and 7214 are performed, then the startup time associated with the communication session may be reduced by approximately three seconds, which is the typical time period required to conduct the V.8bis procedures. Accordingly, even if query task 7210 determines that the current channel is not similar to a previous channel, quick startup process 7200 reduces the overall initialization time of modem system 6100.

If query task 7210 finds that the current channel characteristics "match" the stored characteristics of a previously established channel, then a task 7216 may be performed. An abbreviated training procedure is conducted during task 7216. As described in more detail below, modem system 6100 leverages the known characteristics of the current channel such that the modem devices can be immediately trained. For example, although the specific timing phase of digital impairments (e.g., robbed bit signaling) may be unknown, the types of digital impairments will be consistent for repeated connections. Thus, in the context of a V.90 modem system, the lengthy digital impairment learning procedure need not be fully implemented. In addition, the initial training of equalizers and echo cancelers, and the initial determination of PCM codec transmit levels and data rates need not be performed.

A task 7218 may be performed to enable modem system 6100 to operate at an initial data rate. It should be appreciated that portions of the training associated with task 7216 may be performed at the initial data rate associated with task 7218. Modem system 6100 is able to quickly operate at the initial data rate by recalling the initialization parameters associated with the previously stored channel. During task 7218, modem system 6100 may perform final training of the equalizers and echo cancelers, exchange modulation parameters, and exchange constellation signal points for use during the full rate data mode. In accordance with the present invention, PPP data may be transmitted during task 7218 in connection with one or more final training sequences. For example, the PPP data may be associated with the exchange of log-in authentication information, e.g., CHAP or PAP information. In view of the transmission of data during task 7218, this portion of quick startup process 7200 may be considered to be a first data mode or a data phase one.

Following task 7218, quick startup process 7200 causes modem system 6100 to operate at a final data rate (task 7220). In the context of this embodiment, this portion of process 7200 may be considered to be a second data mode or a data phase two. The transition between the initial and final data rates preferably occurs in a seamless manner; modem system 6100 employs a suitable signal timing or synchronization technique to enable such a data rate transition. During the full data mode, modem system 6100 utilizes the signal point constellation exchanged during task 7218. Once modem system enters the final data mode, quick startup process 7200 ends.

Figure 8:
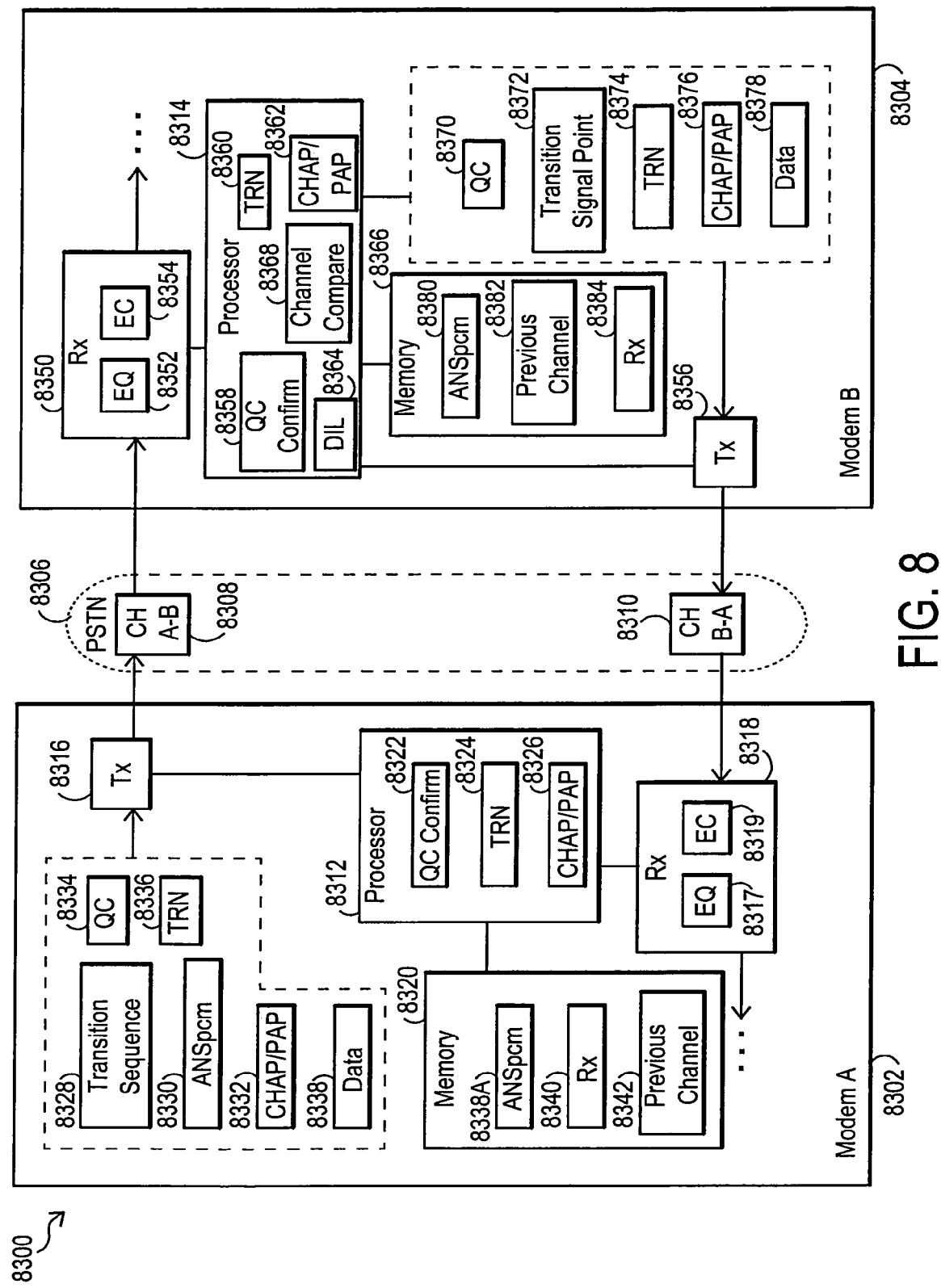
FIG. 8 is a block diagram depicting an illustrative modem system configured in accordance with the present invention.

FIG. 8 is a block diagram depicting an illustrative modem system 8300 configured in accordance with the present invention. Modem system 8300 is preferably configured to carry out quick startup process 7200 and other processes described herein. By way of example, modem system 8300 is described herein in the context of a 56 kbps or V.90 system (or a system substantially similar to a V.90 system). However, it should be appreciated that the particular implementation shown in FIG. 8 is not intended to limit the scope of the present invention in any way.

Generally, modem system 8300 includes a first modem, e.g., modem 8302, and a second modem, e.g., modem 8304. In the context of this description, modem 8302 is considered to be a server modem and modem 8304 is considered to be a client modem (see FIG. 6). It should be appreciated that modems 8302 and 8304 may be similarly configured such that both can function in either a transmit or receive mode. Modems 8302 and 8304 are generally configured in accordance with known principles to communicate over a telecommunication network, such as the public switched telephone network ("PSTN") 8306, via at least one communication channel (e.g., channels 8308 and 8310). For purposes of this description, modem 8302 is connected digitally to PSTN 8306 while modem 8304 is connected to PSTN via a central office (not shown) and an analog local loop, as described above in connection with FIG. 6. For the sake of clarity, FIG. 8 does not show the various encoder, decoder, and other functional elements that would typically be present in a practical modem system.

Modem 8302 may include a processor element 8312, while modem 8304 may include a processor element 8314. In addition to the specific operations described herein, processors 8312 and 8314 are suitably configured to carry out various tasks associated with the operation of modem system 8300. Indeed, modem system 8300 may incorporate any number of processors, control elements, and memory elements as necessary to support its functionality. Such processor, control, and memory elements may suitably interact with other functional components of modems 8302 and 8304 to thereby access and manipulate data or monitor and regulate the operation of modem system 8300.

Processor 8312 may be operatively associated with a quick connect confirmation routine, which is illustrated as a functional block 8322. Quick connect confirmation routine 8322 may be employed during query task 7204 (see FIG. 7). Processor 8312 is also operatively associated with a number of training routines 8324. Training routines 8324 may be utilized for initial and/or final training of modem system 8300. Training routines 8324 may be employed during task 7216, as described above. Processor 8312 may also operate in conjunction with a dial-up authentication scheme 8326, e.g., information exchanging in accordance with PAP or CHAP. The CHAP/PAP functionality may be alternatively (or additionally) realized in one or more software applications maintained by the server corresponding to modem 8302. These illustrative operations are not intended to limit the applicability of processing element 8312, which is preferably configured to support any number of additional operations.

Modem 8302 includes a transmitter 8316, which is configured to transmit encoded symbols in accordance with conventional data transmission techniques. Such symbols may represent data, training sequences, synchronization signals, control signals, information exchange sequences, and any suitable communication signal utilized by modem system 8300. Modem 8302 also includes a receiver 8318, which may be configured in accordance with any number of known modem technologies. Receiver 8318 is configured to receive communication signals from modem 8304; such signals may include encoded information bits, control signals, information exchange sequences, training sequences, and the like. Receiver 8318 may include or be functionally associated with an equalizer structure 8317 and an echo canceler structure 8319. The configuration and operation of equalizer structure 8317 and echo canceler structure 8319 may be consistent with any number of conventional techniques, e.g., adaptive filtering algorithms.

Modem 8302 is preferably configured to generate, process, and transmit different data and signals associated with the operation of modem system 8300. Such data, signals, and sequences may be suitably stored, formatted, and produced by any number of microprocessor-controlled components. For illustrative purposes, FIG. 8 depicts a number of blocks related to different operational features of modem system 8300; such operational features may have specific data sequences, control signals, or the like, associated therewith. Although a practical system may process and transmit any amount of additional or alternative data, the particular embodiment described herein functions in cooperation with at least the following types of data: a transition sequence 8328, an answer signal point sequence 8330, authentication information 8332, a quick connect identifier 8334, training information 8336, and user data 8338. This data, and the handling of the data by modem system 8300, is described in detail below.

Modem 8302 also includes a suitable amount of memory 8320 necessary to support its operation. Memory element 8320 may be a random access memory, a read only memory, or a combination thereof. Memory element 8320 may be configured to store information utilized by modem system 8300 in connection with one or more processes related to the present invention. For example, memory element 8320 may be configured to store a suitable answer signal point sequence 8338A. Memory 8320 may store specific signal points, transmit levels, a pattern utilized to format a sequence for transmission, or the like. In the preferred embodiment, answer signal point sequence 8338A corresponds to sequence 8330 (described above). Memory element 8320 may also be configured to store a number of parameters related to the training of receiver 8318. These receiver parameters, which are depicted as block 8340, may be associated with the initialization of equalizer structure 8317 and/or echo canceler structure 8319. As a practical matter, memory element 8320 may store information related to the analog and/or digital characteristics, e.g., filter tap coefficients, of equalizer structure 8317 and echo canceler structure 8319, and transmit codec level estimates.

In accordance with a preferred embodiment of the present invention, memory element 8320 is also capable of storing a number of parameters, attributes, and/or characteristics of a previously established channel (illustrated as a previous channel block 8342). The previous channel parameters 8342 may be stored at any suitable time during a communication session or periodically updated during a session. Indeed, modem 8302 and modem 8304 may both be configured to save the current channel parameters to anticipate a temporary interruption, delay, or disconnection associated with the current communication session (whether such interruption, delay, or disconnection is intentional or unintentional). As described in more detail below, in response to a temporary disconnection or pause in the modem data transmission mode, modem 8302 can be placed "on hold" until the communication session is to be reinitiated. At that time, modems 8302 and 8304 may access the stored channel parameters rather than conduct a lengthy retrain procedure.

Modem 8304 includes a receiver 8350, which is operatively associated with an equalizer structure 8352 and an echo canceler structure 8354. Receiver 8350 is configured to receive communication signals from modem 8302. Modem 8304 also includes a transmitter 8356 configured to transmit communication signals to modem 8302. These components of modem 8304 may be similar to the corresponding components of modem 8302. Thus, for the sake of brevity, the description of features and functions that are common to modems 8302 and 8304 will not be repeated in this description of modem 8304.

Processor 8314 may be operatively associated with a quick connect confirmation routine 8358, one or more training routines 8360, and a dial-up authentication scheme 8362. These processing functions are similar to the corresponding functions described above in connection with processor 8312. In addition to these features, processor 8314 may be operatively associated with a digital impairment learning routine 8364. Digital impairment learning routine 8364 may be compatible with the digital impairment learning procedure carried out by conventional V.90 modems. Routine 8364 may be utilized to enable modem 8304 to analyze a digital impairment learning sequence transmitted by modem 8302 and to determine the types of digital impairments present in the communication channel and any timing phases associated with such digital impairments. Routine 8364 may interact with a memory element 8366 such that modem 8304 can store the digital impairment profile associated with a given communication channel. Routine 8364 may enable modem 8304 to select appropriate signal points (or a signal point) that function to illuminate or highlight robbed bit signaling present in the channel. For example, if modem 8304 determines that the network forces robbed bits (typically the least significant bit of a symbol) to zeros, then a signal point having a least significant bit of one may be selected such that the robbed bit signaling phases can be easily detected.

Processor 8314 may also be configured to conduct a channel comparison routine 8368, which may be performed during task 7210 described above in connection with FIG. 7. Channel comparison routine 8368 preferably determines whether the characteristics of the current communication channel are similar to stored characteristics associated with a previously established communication channel. In the context of this description, the current channel is a repeated connection of the previously established channel, and a number of stored characteristics may be resident in memory element 8366. Routine 8368 is described in more detail below.

As with processor 8312, the illustrative operations set forth herein are not intended to limit the applicability of processing element 8314, which is preferably configured to support any number of additional operations.

Like modem 8302, modem 8304 is configured to generate, process, and transmit different data and signals associated with the operation of modem system 8300. Such data, signals, and sequences may be suitably stored, formatted, and produced by any number of microprocessor-controlled components. Although a practical system may process and transmit any amount of additional or alternative data, transmitter section 8356 is illustrated in conjunction with the following types of data: a quick connect identifier 8370, a transition sequence signal point identifier 8372, training information 8374, authentication information 8376, and user data 8378. This data, and the handling of the data by modem system 8300, is described in detail below.

As mentioned above, modem 8304 includes a suitable amount of memory 8366 necessary to support its operation. Memory element 8366 is similar to memory element 8320. In the preferred embodiment, memory element 8366 is configured to store an answer signal point sequence 8380 that is related to the corresponding answer signal point sequence 8338A utilized by modem 8302. In this embodiment, the same answer signal point sequence is predetermined and known at both modems 8302 and 8304. Memory element 8366 may also store a number of parameters, attributes, and/or characteristics of a previously established channel (illustrated as a previous channel block 8382). The previous channel parameters 8382 may be stored at any suitable time during a communication session or periodically updated during a session. Like memory element 8320, memory element 8366 may also be configured to store a number of parameters 8384 related to the training of receiver 8350. These stored receiver parameters 8384 are preferably accessed by modem 8304 to effectively reduce the startup latency typically experienced with conventional V.90 modem systems.

A number of features of the present invention contribute to the reduction in conventional V.90 modem startup and/or reconnect times, e.g., the elimination or abbreviation of the V.8bis procedure, the elimination or abbreviation of the initial training procedure, and the exchanging of login authentication data earlier in the initialization process (rather than waiting until the full data rate is achieved). In one embodiment, the login authentication data is exchanged while the modem system is in an initially trained mode associated with an intermediate data rate. Any one of these (and other) features of the present invention may be implemented in modem system 8300.

Figure 9:
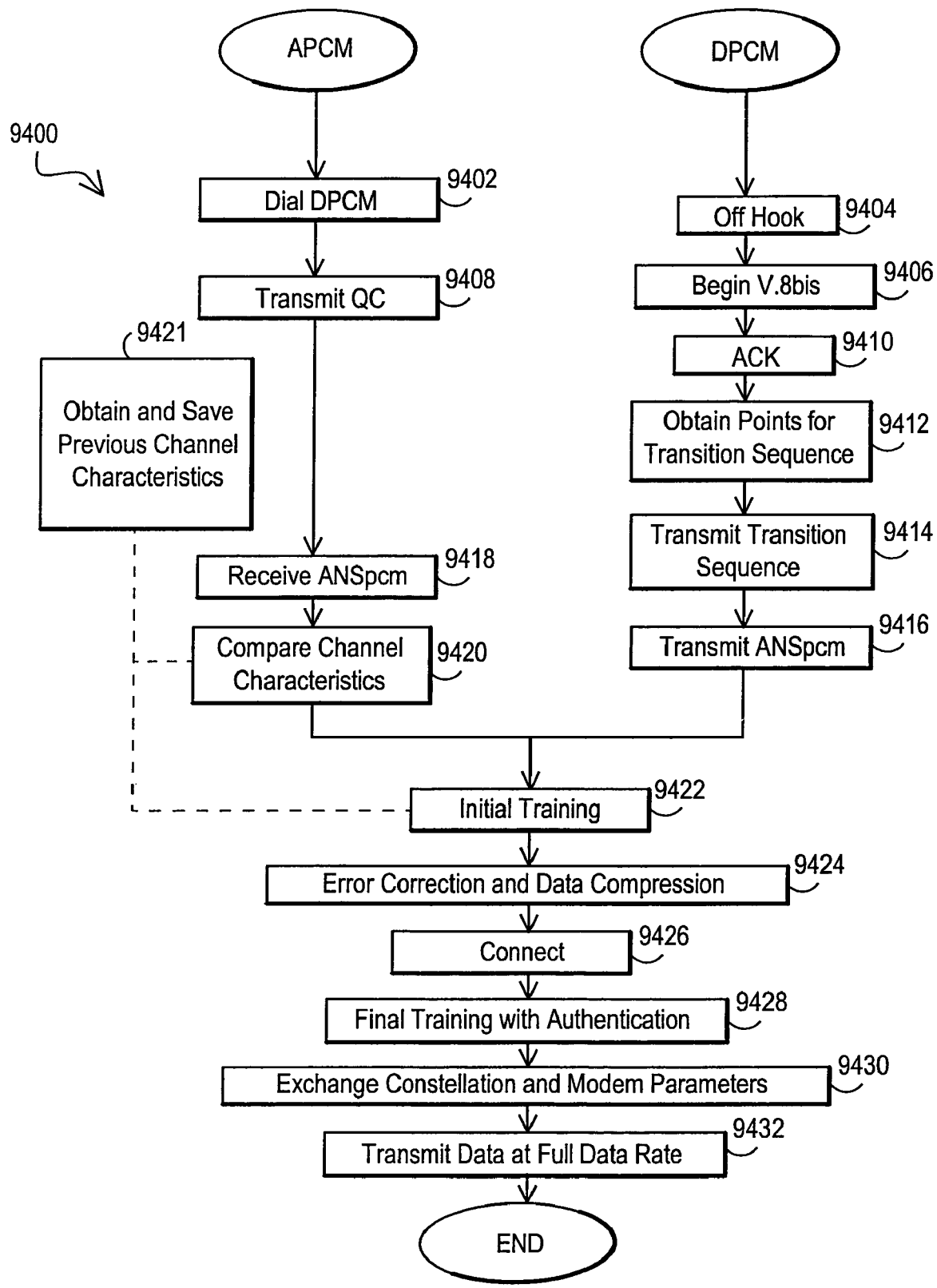
FIG. 9 is a flow diagram illustrating portions of a quick startup process performed by two modem devices.
Figures 2, 10:
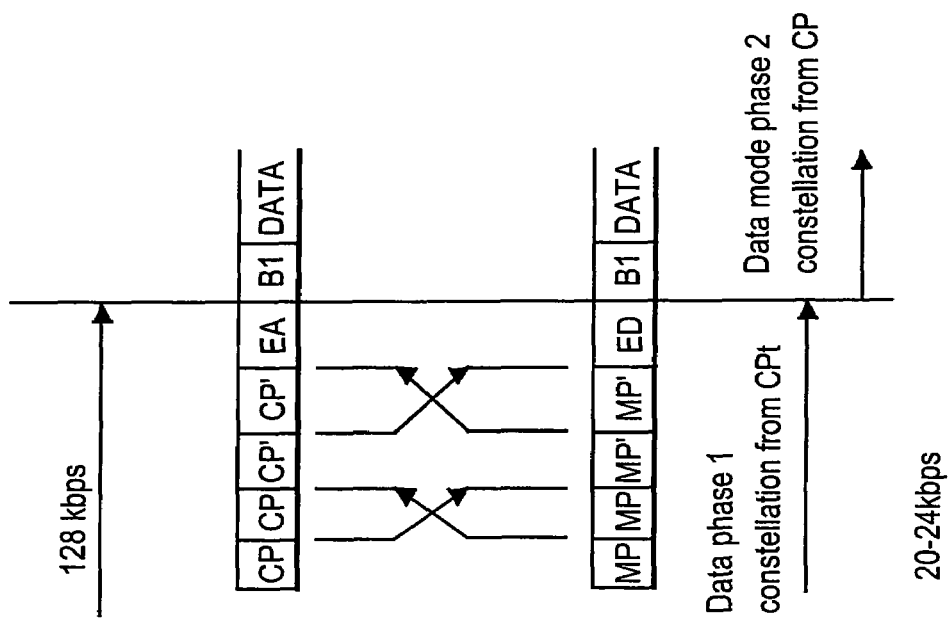
FIG. 10 is a timing diagram corresponding to a quick startup process performed by two modem devices.

FIG. 9 is a flow diagram illustrating portions of a quick startup process 9400 performed by two modem devices, and FIG. 10 is a timing diagram 1500 corresponding to an illustrative quick startup process performed by two modem devices. Timing diagram 1500 includes acronyms and abbreviations that are often used in the context of V.8, V.8bis, V.34, V.90, and other data communication protocols. The use of such terminology herein is intended to illustrate the concepts of the present invention in the context of one practical embodiment. However, the present invention may be employed in any suitable context, and the specific signals, number of sequences, timing of the sequences, data rates, and interaction between the two modem devices shown in FIG. 10 are not intended to limit the scope of the invention in any way.

Quick startup process 9400 is depicted in a manner that indicates tasks associated with a client modem, e.g., an analog pulse code modulation modem ("APCM"), and a server modem, e.g., a digital pulse code modulation modem ("DPCM"). Similarly, timing diagram 1500 shows the general sequencing of signals transmitted by an APCM and a DPCM. In FIG. 10, the arrows between the two major sequences represent responses or interactions between the APCM and the DPCM.

Quick startup process 9400 may begin with a task 9402, which causes the APCM to dial the telephone number associated with the DPCM. As described above, the call will be established over local loop 6112, central office 6110, and digital telephone network 6108 (see FIG. 6). In response to the initial ring tone, the DPCM may be placed in an off hook state (task 9404), i.e., the DPCM will answer the call. Of course, the APCM and the DPCM may be configured to place, answer, and process calls in accordance with conventional telephony protocols. Following task 9404, a task 9406 may be performed to initialize a capabilities exchange protocol such as V.8 or V.8bis. In the embodiment described herein, a capabilities request signal (represented by CRe' in FIG. 10) may be transmitted during task 9406. The CRe' signal may function to inform the APCM that the DPCM supports the quick connect procedure. The CRe' signal may be a modified version of the conventional V.8bis signaling tones, e.g., the V.8bis tones may be amplitude modulated. Alternatively, the frequency associated with a signaling tone may be jittered in a periodic manner or a low-level wideband signal may be added to a tone. In this manner, legacy modem systems will recognize the CRe' signal as the normal V.8bis CRe signal.

In response to the establishment of a call associated with the current communication channel, the APCM may perform a task 9408 to suitably transmit a quick connect identifier (QC) to the DPCM. In the practical embodiment described herein, the transmission of the quick connect identifier may be prompted in response to the detection of the CRe' signal by the APCM. The QC signal is preferably designed such that legacy modems and modems that do not support the quick connect protocol are not adversely affected by the QC signal, i.e., the QC signal should be ignored by non-compatible devices. (If the APCM does not support the quick connect techniques described herein, then it will not generate the QC signal and the startup will proceed in a conventional manner, as described above in connection with FIG. 7). In a preferred embodiment, the QC signal also conveys a signal point identifier that identifies signal points (or one point) for use by the DPCM in a transition sequence (represented by QTS and QTS in FIG. 10 where the signal points function to highlight, illuminate, or make apparent the digital impairments present in the communication channel. Thus, the QC signal sequence performs a dual function.

Assuming that the DPCM also supports the quick connect methodology, it preferably performs a task 9410 in response to the reception of the QC signal. In connection with task 9410, the DPCM transmits a quick connect acknowledgment (represented by the QCA signal in FIG. 10). As described above in connection with FIG. 7, if the DPCM does not acknowledge the QC signal, or if the APCM somehow fails to receive the QCA signal, then the modem system will proceed with a conventional startup procedure. The format, configuration, and processing of the QC and QCA signals may be carried out by the respective portions of the individual modems, as described above in connection with modem system 8300 (see FIG. 8).

If the DPCM and the APCM both support the quick connect technique, then any number of initialization routines may be eliminated, modified, or abbreviated, depending upon the specific application. For example, in the context of a V.90 compatible modem system, the transmission of the QC signal may inherently indicate that the APCM is V.90 compliant. Similarly, the transmission of the QCA signal may inherently indicate that the DPCM is also V.90 compliant. Consequently, the modem system may eliminate portions or the entirety of the normal capabilities exchange protocol or protocols, such as V.8 and/or V.8bis. This feature by itself can reduce the startup latency by as much as five seconds (for a typical connection).

It should be appreciated that the quick connect identification and verification scheme described above in connection with task 9402 through task 9410 can be equivalently applied when the DPCM initiates the call to the APCM. Such a situation may arise when, in response to an initial call or request from the APCM, the DPCM calls the APCM to establish the communication channel. In this situation, the APCM will transmit the CRe' signal, the DPCM will transmit the QC signal, and the APCM will transmit the QCA signal. In contrast to the above description where the APCM initiates the call, the APCM may transmit an additional signal or sequence to suitably identify the transition sequence signal points to the DPCM (rather than embedding the signal points in the CRe' or QCA sequences).

Following task 9410, the DPCM may perform a task 9412 to obtain the signal points (or point) for use in a transition (or synchronization) sequence. As discussed above, the QC signal preferably conveys information that identifies signal points that make the presence of robbed bit signaling easily detectable by the APCM. The determination of the particular signal points may be carried out by the APCM, as described above in connection with the digital impairment learning procedure 8364 (see FIG. 8). This determination may be based on past analyses of the digital impairments associated with a previous connection over the same channel. Task 9412 may be performed by processor 8312 after the APCM receives the QC signal.

In response to task 9412, a task 9414 may be performed such that a suitable transition sequence is transmitted by the DPCM. In an exemplary embodiment, the transition sequence includes positive and negative values of the signal points obtained in task 9412. Accordingly, the DPCM may utilize the signal points selected by the APCM and a suitable sign pattern (which may be predetermined) to generate the transition sequence. The transition sequence is configured and formatted such that the APCM, upon detecting the transmission sequence, can synchronize itself to the subsequent signal or sequence transmitted by the DPCM. In this manner, the APCM receiver can obtain its timing from the transition sequence. The transmission sequence may be of any predetermined length and have any predetermined sign pattern. For example, in the embodiment depicted in FIG. 10, the transition sequence is represented by the quick timing sequence (QTS) and QTS.backslash. signals, where QTS represents a specific signal point sequence and QTS.backslash. is the same sequence having opposite signs. In FIG. 10, the QTS sequence is repeated for 810 symbols while the QTS.backslash. sequence is repeated for 30 symbols.

In accordance with one practical embodiment of the present invention, the QTS sequence is formatted such that the period of the QTS root sequence and the period of the robbed bit signaling ("RBS") associated with the network connection have no common denominator (other than one). For example, one suitable QTS root sequence is 0, +A, −A, +A, −A (where A represents a signal point that highlights the presence of RBS. Thus, for the embodiment illustrated in FIG. 10, this QTS root 30 sequence, which has a period of five, is repeated 162 times while the QTS.backslash. sequence includes six repetitions of the root QTS sequence with inverted signs.

For the above example, where the RBS period is assumed to be six, the received transition sequence may be subjected to a 30-point discrete Fourier transform ("DFT") to obtain the timing phase of the DPCM. In addition, the presence of RBS will be revealed at certain discrete frequencies associated with the DFT result. In this manner, timing and RBS information can be extracted from the received transition sequence. In addition, the timing phase information is obtained independently from the RBS information.

The DPCM is preferably configured to transmit a specific signal point sequence during a task 9416. The signal point sequence may be considered to be a modified answer tone, as that term is understood by those familiar with modem protocols. In FIG. 10, this signal point sequence is represented by the ANSpcm signal. As depicted in FIG. 8, a predetermined ANSpcm sequence 8338A may be stored in memory element 8320 for transmission by transmitter section 8316. In a practical embodiment, the DPCM transmits the ANSpcm signal following the transition sequence. This may be desirable to enable the APCM to anticipate the signal point sequence once it detects the transition sequence. In other words, the detection of the transition sequence by the APCM will indicate that the signal point sequence will follow.

In a preferred embodiment, the ANSpcm signal comprises a sequence of pulse code modulation signal points or a sequence of signal points associated with pulse code modulation signal points. For example, the ANSpcm signal may be formatted as a sequence of mu-law or A-law codewords or a sequence of universal codewords (U-codes). The APCM and the DPCM are preferably configured such that the ANSpcm signal is predetermined and known prior to the initiation of quick startup process 9400. In an alternate embodiment, a number of different ANSpcm signals may be suitably stored in lookup tables or the ANSpcm signal may be designed by one of the modem devices and communicated in a suitable manner to the other modem device prior to task 9416. For example, the ANSpcm signal may be designed such that the presence of RBS can be easily detected by the APCM by analyzing the received ANSpcm signal. In such an embodiment, it may not be necessary for the transition sequence (QTS and QTS) to identify or highlight the RBS.

In the context of V.8, the answer tone is generated as an amplitude modulated 2100 Hz tone. In contrast, the present invention utilizes the ANSpcm signal to generate a tone (e.g., a 2100 Hz tone) in a digital manner using pulse code modulation signal points. In other words, the ANSpcm signal is a digital representation of an analog signal. The ANSpcm signal is preferably constructed with known pulse code modulation points such that the ANSpcm signal may be used for purposes other than a mere answer tone. In a preferred embodiment, the ANSpcm signal includes many of the available pulse code modulation points associated with the particular telephone network. This aspect of the ANSpcm signal is desirable such that the ANSpcm signal may be used to determine or identify the characteristics of the current communication channel, particularly digital pads. The use of a large number of the possible codewords ensures that the ANSpcm signal will detect digital pads that may merge two input levels into one output level. The ANSpcm signal is also configured to provide a tone suitable for disabling the network echo cancelers and disabling the network echo suppressors.

As described above, the APCM anticipates the transmission of the ANSpcm signal. The digital impairments and analog characteristics associated with the communication channel will affect the ANSpcm signal as it is transmitted from the DPCM to the APCM. A task 9418 may be performed by the APCM to obtain a received sequence that is related to the ANSpcm signal point sequence. The APCM may then perform a task 9420 to compare a number of attributes of the received sequence with a number of stored attributes of a previously received sequence associated with a previously established communication channel. In an illustrative embodiment, the previously received sequence is a digital impairment learning ("DIL") sequence, which is a line probing sequence. In this respect, task 9420 determines whether a characteristic of the current channel is similar to a corresponding characteristic of a previously established channel. In a preferred embodiment, the channel characteristics compared in task 9420 are related to the digital impairments in the channel. In other words, task 9420 validates a current digital impairment channel profile with a stored digital impairment channel profile. Task 9420 may be performed by a suitable processor element of the APCM (see FIG. 8).

During task 9420, any measurable characteristic of the points/levels, any measurable characteristic of the received sequence as a whole, and/or any measurable signal or quantity associated with the points/levels may be analyzed by the APCM. For example, any number of individual points or levels contained in the received sequence may be compared to corresponding points or levels stored at APCM (the stored points or levels may be associated with a prior DIL procedure). If the received points/levels "match" the stored points/levels or if the differences between the received and stored points/levels are within a certain threshold, then the APCM may assume that the current channel attributes match the stored channel attributes (see query task 7210 in FIG. 7).

The APCM may perform a procedure 9421 to suitably obtain and save a number of attributes or characteristics of a previously established connection to the current channel. As described above, procedure 9421 may cause the APCM to store the characteristics of the points/levels contained in a received DIL sequence. These past values are thereafter used during task 9420. In this respect, procedure 9421 may update the previous values with new DIL values after the comparison in task 9420 is completed, e.g., in response to a subsequent DIL procedure associated with the current connection.

As described above in connection with FIG. 7, if task 9420 determines that the channel characteristics do not sufficiently match, then the modem system may revert to a conventional V.90 startup procedure. FIG. 10 illustrates that the APCM may fall back into the V.8 protocol and transmit a conventional V.8 call menu (CM) message to the DPCM. The conventional V.8 startup for the APCM then follows along a sequence 1502. In response to the CM message, the DPCM generates a conventional V.8 joint menu (CM) message and proceeds in accordance with the conventional V.8 initialization (indicated by a sequence 1504). For the sake of illustration, quick startup process 9400 assumes that task 9420 determines that the current communication channel is similar to a previously established communication channel.

If the APCM validates the current channel characteristics with a previous channel, then it may trigger a quick startup routine to further reduce the initialization time associated with the modem system. Alternatively, the DPCM may be configured to trigger the quick startup routine. Accordingly, a task 9422 may be performed, during which the modem system is initially trained. (For the sake of clarity and brevity, portions of task 9422 and portions of the subsequent tasks may be performed by both the APCM and the DPCM; quick startup process 9400 depicts such combined functionality in the context of single process tasks). Task 9422 may cause the APCM and the DPCM to be initialized in response to a number of stored parameters associated with the previously established communication channel. As mentioned above, the stored parameters may be related to the initialization or training of the equalizers, echo cancelers, transmit power levels, initial signal point constellations, or the like. Task 9422 may operate in conjunction with procedure 9421, which preferably functions to obtain and store the initialization parameters associated with the previous connection. In this respect, procedure 9421 may be suitably designed to periodically save such parameters during the normal data mode of the previous connection, after a renegotiation process, or in response to any condition or event associated with the previous communication session. Procedure 9421 may also be configured such that erroneous settings or initialization parameters are not inadvertently saved.

In the context of a typical V.90 connection, task 9422 may be related to a two-point training phase. Using the previous parameters, the modem system may be able to skip or abbreviate the conventional V.90 Phase 2 probing and ranging procedure and to skip or abbreviate the conventional V.90 Phase 3 digital impairment learning and initial training procedures. As shown in FIG. 10, the APCM and the DPCM may each transmit training sequences (represented by the TRN1 signals) during task 9422. These training signals may be utilized to adaptively adjust the equalizer and echo canceler filter taps and to otherwise facilitate training of the modem system. Thus, one of the most time consuming procedures of a V.90 startup (the training of the APCM equalizer) can be performed in an efficient manner that allows ample time for fine tuning and training.

In addition to the initial training that occurs during task 9422, a task 9424 may be performed. During task 9424, the modem system may conduct error correction and/or data compression protocols. In a conventional V.90 modem system, the V.42 Recommendation is followed for purposes of error correction and the V.42bis Recommendation is followed for purposes of data compression. For example, in a normal V.90 operating mode associated with a PPP connection, the V.42 and V.42bis procedures are performed after final training and before the CHAP/PAP authentication procedure. V.42 and V.42bis are performed prior to the CHAP/PAP procedure because the CHAP/PAP procedure is better suited to an "error free" channel. In contrast to conventional V.90 systems, task 9424 may perform V.42bis during Phase 3 of the V.90 startup. The shifting of V.42bis forward in the startup process contributes to the reduction in connection time. In FIG. 10, the XID' signal represents a modified version of the conventional V.42 XID signal. For example, the XID' signal may utilize a subset of the XID parameters used to negotiate compression and the like. Portions of the V.42bis procedure may also be conducted in connection with various modified signal sequences shown in FIG. 10. For example, the CPt' signal may represent the conventional V.90 CPt signal combined with one or more V.42bis signals.

In the preferred embodiment, the V.42bis procedures are performed to provide a substantially "error free" channel. Following task 9424, a CONNECT message is issued to the host software (task 9426). The CONNECT message indicates that the modem system is ready to transmit data at an initial data rate at this time. The CONNECT message may be formatted, generated, and transmitted in accordance with known techniques.

In response to the CONNECT message, the host software begins a "simultaneous" upper layer protocol login procedure, e.g., a CHAP or PAP procedure (task 9428). Task 9428 may be initiated automatically by the host software or in response to a user entry. The CHAP/PAP data transmission occurs in conjunction with a final training process. In the preferred embodiment, the APCM and the DPCM transmit the CHAP/PAP authentication data as scrambled digital data over the communication channel. The scrambling of the authentication data enables the modem devices to perform final training on the authentication data. In a conventional V.90 modem system, the final training signals are formatted as scrambled "ones". The scrambled ones carry no information; the final training signal is merely utilized as a spectrally white source. The present invention leverages the final training signals to carry user data while the modem devices complete the training process. Although CHAP/PAP data is one preferred form of user data, the present invention is not limited to the transmission or exchange of authentication data. In addition, the particular scrambling algorithm may vary from application to application.

In FIG. 10, the dual function signals are represented by the TRN2A/PPP and TRN2D/PPP signals. In this respect, the receiver sections in the modem devices may be trained at an initial data rate during a first time period, e.g., during a data phase one, such that they may seamlessly transfer to operating at a final data rate during a subsequent time period, e.g., during a data phase two. Furthermore, the PPP log-in procedure can be performed at the initial data rate during the first time period rather than after the modem system has been fully initialized.

During the initial data rate period, a task 9430 may be performed to enable the APCM and the DPCM to exchange constellation parameters and modulation parameters (represented by the CP and MP signals in FIG. 10) in a suitable manner. Task 9430 may be performed in a conventional V.90 manner. These parameters may be utilized by the modem devices during the subsequent data mode. After the training and authentication procedures are completed, the modem system preferably transitions to a full data rate in a seamless manner. A task 9432 may be performed to conduct data transmission at the full data rate. This period may be referred to as the data phase two. Once the modem system enters the full data mode, quick startup process 9400 ends.

In contrast to the conventional V.90 modem startup summarized in Table 1, a modem system according to the present invention may experience a reduced startup latency, as set forth in Table 2 below. Notably, the startup time summarized in Table 2 is approximately half of the startup time summarized in Table 1. The considerable reduction in startup latency would be desirable in many situations, particularly in the context of a PPP dial-up internet connection using V.90 or legacy 56 kbps modem systems.

TABLE 2

Quick V.90 Modem Startup

| PROTOCOL | OPERATION | TIME (seconds) |
|---|---|---|
| — | Dialing | 1 |
| — | Call Establishment | 1 |
| V.8bis (abbreviated) | Capabilities Exchange | 1 |
| — | Modified Answer Tone | 1 |
| V.90 Phase 3 + V.42/ V.42bis | Initial APCM Training; Error Correction; Data Compression | 2.5 |
| V.90 Phase 4 + Login | Final APCM Training; Set Power Levels; Constellation Transmission; Username & Password | 2-5 |
| | TOTAL = | 8.5-11.5 |

The techniques of the present invention may be implemented in other contexts to reduce the reinitialization time associated with reconnects after a line corrupting event or a channel interruption. For example, many telephone customers subscribe to call waiting, caller identification, and other telephony services. However, such services may be disabled or nonfunctional if the telephone line is being utilized for a modem connection. If call waiting is not disabled during a modem connection, then the signal tones may interrupt the modem connection. If the user decides to answer the waiting line, then the off-hook and on-hook flash may cause the modem system to retrain its receivers or prompt a full reconnect procedure.

Rather than perform a time consuming reconnect or retrain procedure, a modem system may be configured to utilize stored analog and digital impairment information, equalizer settings, power levels, echo canceler settings, constellations, and the like. Such stored information can be used to immediately reset the modem system parameters if the channel connection is interrupted by a call waiting procedure, by an off-hook condition at an extension telephone device, by a caller identification request, or by any channel corruption event, whether such event is planned or unintentional. In this scenario, both the client modem and the server modem may store the relevant system attributes, modem operating parameters, channel characteristics, and/or network characteristics.

In one practical example, in response to a call waiting tone, the client modem may signal the server to enter a standby mode. The server modem can then switch into an FSK mode to suitably detect the Class 2 caller identification information while the server idles. If the user wants to answer the second call, then the client modem may periodically transmit standby signals or heartbeat tones to the server to instruct the server to continue holding. When the second call ends and the user desires to commence the data call, the client modem would commence a quick reconnect handshaking protocol (described below). On the other hand, if the user wants to terminate the first call, then a clear down message may be sent (alternatively, the periodic hold signal may end).

The quick reconnect handshake causes the modem devices to recall the saved parameters and attributes of the "held" channel and the saved operating parameters associated with the modem devices, as described briefly above in connection with previous channel parameters 8342 and 8382. With this technique, the modem system can be reconnected in a matter of seconds. Thus, the data mode user will not suffer the long reconnect penalty after handling an incoming call waiting or caller identification signal. The data mode user, using call waiting in this fashion, would be capable of accepting intermittent interruptions without noticeable delays associated with the modem connection.

This feature may be utilized to simulate an "always connected" mode with conventional PPP modem connections. For example, pertinent channel compensation information may be periodically saved for a given connection between a client modem and a server modem. The client user may answer incoming second line calls while pausing the data mode as described above. In addition, the data mode may be gracefully terminated if the client user initiates an outgoing voice call. After the voice call terminates, the client modem may re-dial or otherwise re-contact the server modem and establish a quick connection using the stored parameters.

Figure 11:
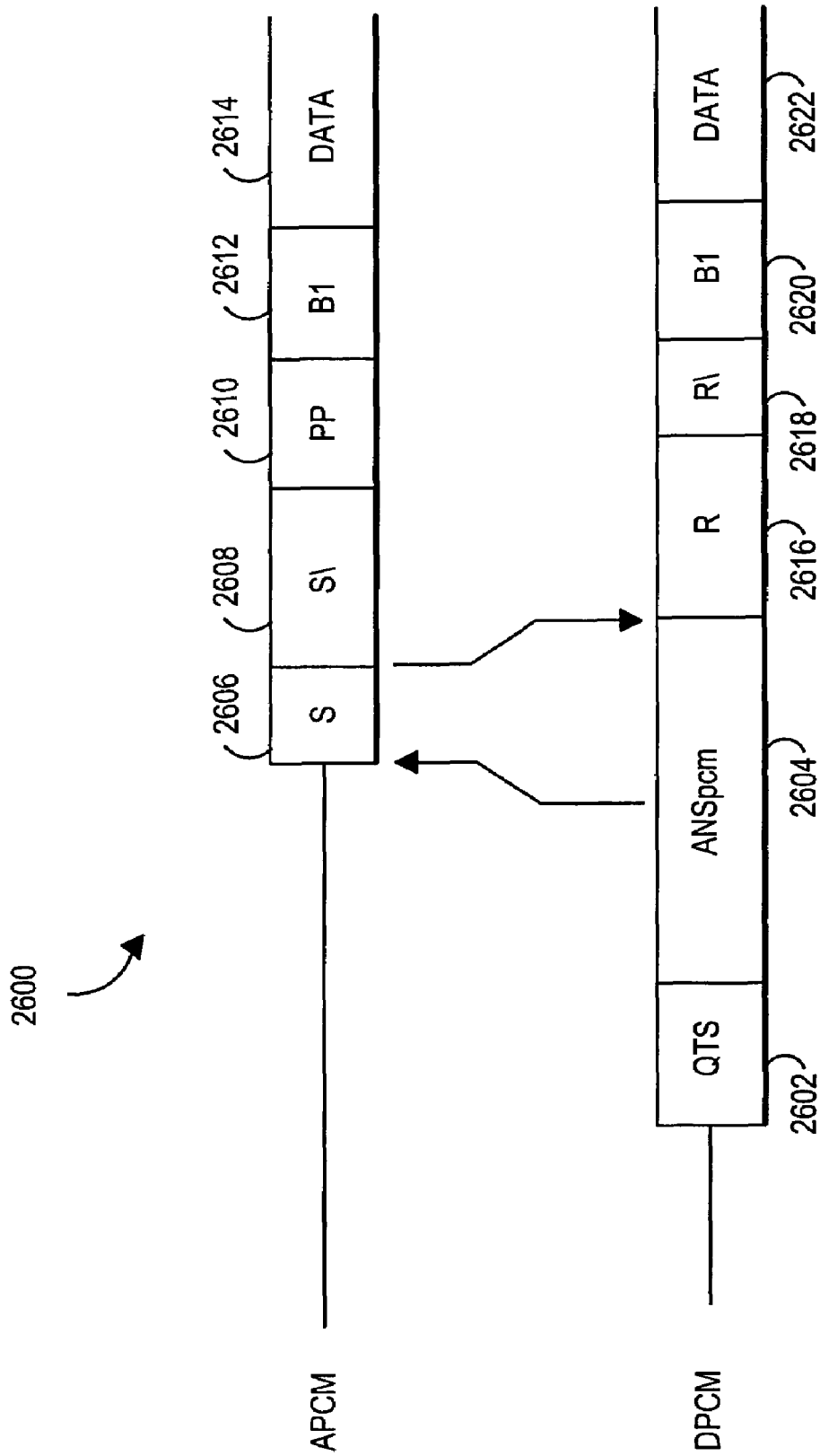
FIG. 11 is a timing diagram corresponding to a quick reconnect process performed by two modem devices.
Figure 12:
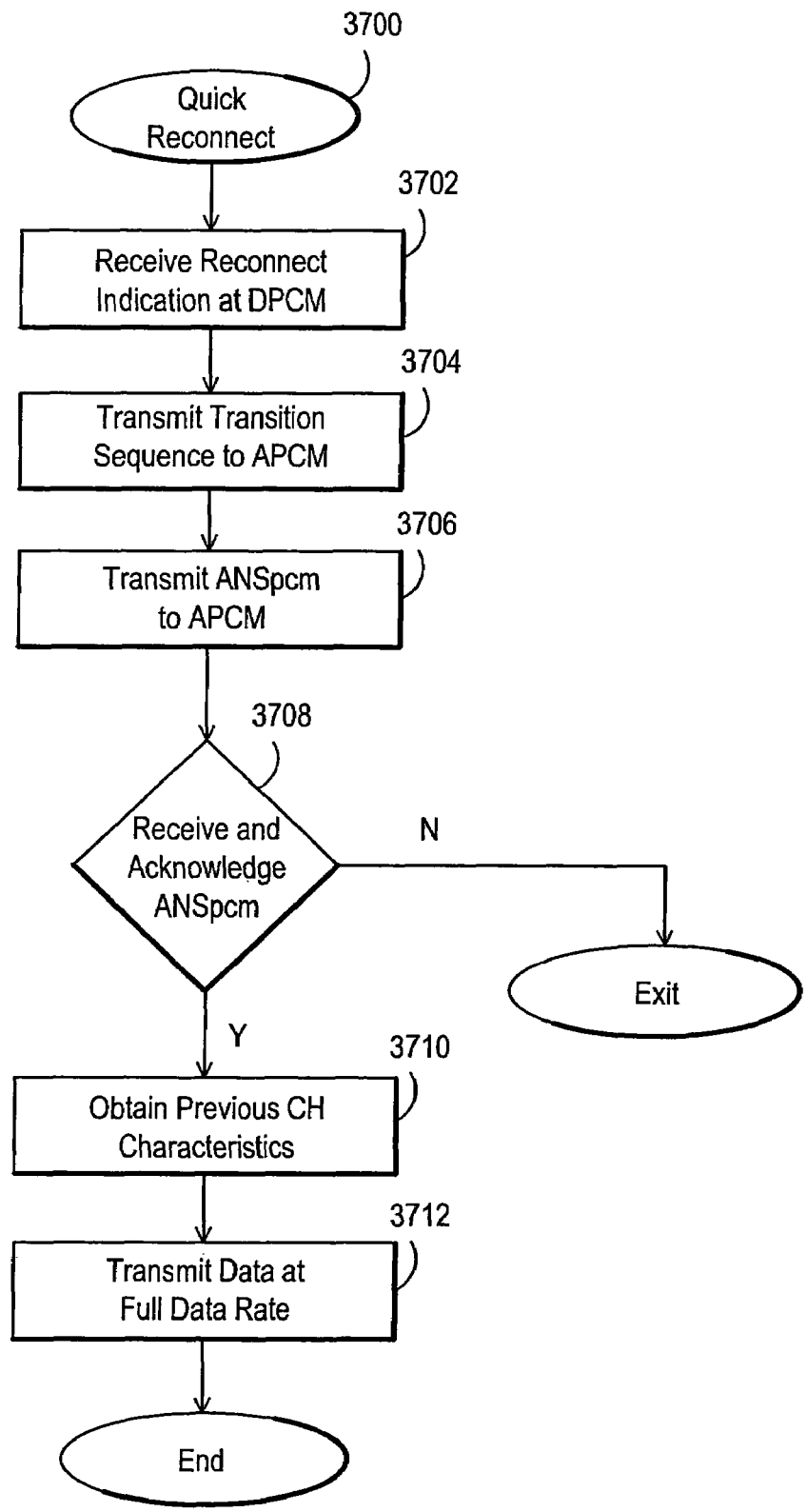
FIG. 12 is a flow diagram illustrating a quick reconnect process performed by two modem devices.

FIG. 12 is a flow diagram illustrating portions of a quick reconnect process 3700 performed by two modem devices, and FIG. 11 is a timing diagram 2600 corresponding to an illustrative quick reconnect process performed by two modem devices. Timing diagram 2600 may include acronyms and abbreviations that are often used in the context of conventional data communication protocols. The use of such terminology herein is intended to illustrate the concepts of the present invention in the context of one practical embodiment. However, the present invention may be employed in any suitable context, and the specific signals, number of sequences, timing of the sequences, data rates, and interaction between the two modem devices shown in FIG. 11 are not intended to limit the scope of the invention in any way.

Quick reconnect process 3700 may be performed by a modem system after such modem system has established a communication session and, typically, after the modem system has entered a full-rate data mode. For purposes of this description, it may be assumed that the modem system is configured as described above (or is configured in an appropriate manner to support the various process tasks described below). It may be assumed that the two modem devices that perform process 3700 are compatible with the quick reconnect techniques described herein. Thus, process 3700 need not perform any verification or signaling to determine whether the quick reconnect procedure can be carried out.

Although not a requirement of quick reconnect process 3700, the modem system may have been initialized in accordance with the quick startup techniques set forth above. Accordingly, process 3700 assumes that both modem devices have stored any number of appropriate channel characteristics, receiver parameters, and other information relevant to the initialization, training, and synchronization of the modem system. As described above, such information may be suitably saved during a startup procedure or periodically during a suitable data mode. Process 3700 may be utilized to enable the current modem connection to be quickly re-established following a temporary pause in the modem data mode or any interrupting event. In this context, a practical system can maintain a communication link or connection between the modem devices while allowing a user of the client modem device to temporarily pause the modem connection (or the modem data communication mode). During the temporary holding period, the user may be able to answer another incoming call in response to a call waiting signal, initiate a new outgoing call, or the like, while the client side modem device idles.

Quick reconnect process 3700 may begin with a task 3702, during which a reconnect indication is received by the DPCM (e.g., modem 8302 shown in FIG. 8). The reconnect indication may be generated in response to a request (e.g., a user-initiated request) to terminate a temporary pause in the modem communication session. For example, a suitable reconnect signal may be generated by the APCM (e.g., modem 8304) in response to a hook flash initiated by the user of the APCM or in response to an instruction generated by application software associated with the APCM. Alternatively, the APCM or a data access arrangement (DAA) associated with the APCM may generate a reconnect signal in response to a change in line current related to the on-hook status of telephone set. Such line-in-use detection techniques are generally known to those skilled in the art. The reconnect indication informs the DPCM that the user desires to re-establish the current modem connection, which has been placed on temporary hold. In a practical embodiment, the DPCM receives the reconnect indication and initiates a task 3704 in response to the reconnect indication.

During task 3704, the DPCM transmits a suitable reply signal that preferably informs the APCM that the quick reconnect procedure is supported. In the illustrative embodiment described herein, such a reply signal may include a suitable transition sequence as described above. Accordingly, quick reconnect process may perform a task 3704, which may be similar to task 9414 described above in connection with FIG. 9. For example, task 3704 may cause the DPCM to transmit the QTS signal to enable the APCM to again determine the timing phase of the DPCM (the QTS signal is identified by reference number 2602 in FIG. 11). In addition, the retransmission of the QTS signal enables the APCM to obtain RBS characteristics of the data communication network (if necessary or desirable to do so).

It should be noted that, for many practical modem connections, the network connection (and the associated effects of digital pads and RBS) will remain consistent during the modem hold period. Of course, there may be some situations where the network connection is cleared down during the modem hold period to conserve network resources. In such situations, particularly if the same network connection is not re-established, the digital impairment profile of the network may not remain consistent. Furthermore, even if the network characteristics do not change, the APCM may lose its RBS synchronization if the modem connection is put on hold (particularly if the APCM does not receive a signal from the DPCM during the holding period). In this respect, even if the APCM can properly resynchronize itself to the network clock after a holding period, the specific RBS phases may still be unknown. Accordingly, quick reconnect process 3700 is preferably arranged to contemplate that the network connection and the RBS timing has changed.

The reply signal may also include a suitable signal point sequence that follows the transition sequence. Accordingly, following task 3704, the DPCM may perform a task 3706 to suitably transmit a signal point sequence to the APCM. As described above in connection with task 9416, the signal point sequence may be considered to be a modified answer tone, e.g., the ANSpcm signal (identified by reference number 2604 in FIG. 11). The ANSpcm signal 2604 may be configured as described above, e.g., the ANSpcm signal 2604 may be suitably formatted to enable the APCM to determine or identify the characteristics of the current communication channel or network, particularly digital pads and/or other digital impairments. The ANSpcm signal 2604 is also configured to provide a tone suitable for disabling the network echo cancelers and disabling the network echo suppressors.

In a practical embodiment, the APCM anticipates the transmission of the ANSpcm signal 2604. For example, the APCM may be configured to condition its receiver to receive the ANSpcm signal 2604 after it transmits the reconnect indication to the DPCM. Accordingly, quick reconnect process 3700 may include a query task 3708, which preferably determines whether the ANSpcm signal 2604 has been received by the APCM and/or whether the DPCM receives a suitable acknowledgment that the APCM received the ANSpcm signal 2604. If not, then process 3700 may exit and the modem system may proceed with a traditional reconnection routine. If query task 3708 determines that the ANSpcm signal 3706 was properly received, then the APCM may process the received signal as described above to enable the APCM to determine the digital impairments associated with the re-established channel.

A task 3710 is preferably performed to cause both modem devices to recall and obtain the characteristics and parameters associated with the previous channel connection, i.e., the channel before the modem connection was placed on temporary hold. Task 3710 may cause the DPCM to access previous channel information 8342 and may cause the APCM to access previous channel information 8384. As described above, this information may include one or more parameters related to: the current channel conditions (as previously determined), any number of settings associated with the modem receivers, characteristics of the communication network, or the like. Task 3710 enables the modem system to quickly retrieve these stored parameters and reset the modem devices in an appropriate mariner in lieu of an independent reassessment of the channel and in lieu of a full retraining process. Task 3710 may be performed by the DPCM once it receives the reconnect identifier from the APCM, while task 3710 may be performed by the APCM before it receives the ANSpcm signal 2604. If task 3710 is performed by the ACPM, the APCM equalizers are initialized according to the previous channel information 8384 such that the ANSpcm signal 2604 can be properly received and analyzed.

The DPCM may reacquire its timing synchronization in accordance with any number of techniques, such as the conventional V.34 half-duplex primary channel resynchronization procedure set forth in ITU-T Recommendation V.34 (International Telecommunication Union, September 1994), which is incorporated by reference herein. In other words, as shown in FIG. 11, the APCM may be configured to transmit a PP signal 2610 to enable the DPCM receiver to synchronize its timing recovery and carrier recovery. The S and S.backslash. preamble signals (reference numbers 2606 and 2608, respectively) may be used to initialize an automatic gain control element or the like. The B1 signal 2612 may be considered to be a preamble sequence that may be employed to initialize the DPCM scrambler, trellis coder, and the like. These signals and sequences are set forth in detail in the V.34 Recommendation and will not be described in detail herein.

Concurrently, the DPCM may transmit an R signal 2616 followed by an R.backslash. signal 2618 and a B1 signal 2620. These sequences also serve as suitable preamble sequences that enable the APCM to prepare for the data mode. These signals and sequences are set forth in detail in the V.90 Recommendation and will not be described in detail herein.

In response to the resynchronization sequences, the modem system enters the data mode and the system can begin transmitting data at the full data rate (task 3712). In other words, the data transmission mode is re-established without completely clearing down the previous connection. The data mode is identified by sequences 2614 and 2620 in FIG. 11. Notably, in contrast to quick startup process 9400, quick reconnect process 3700 need not perform a comparison of the channel characteristics (see task 9420), an initial training procedure (see task 9422), an error correction and data compression procedure (see task 9424), a final training procedure (see task 9428), an authentication exchange (see task 9428), or an exchange of constellation and modem parameters (see task 9430). With respect to the PAP/CHAP authentication information, the modem system may be suitably configured to maintain the PPP/TCP/IP protocol layer during the hold period such that the PPP authentication data need not be retransmitted. Accordingly, the modem system may re-establish its modem connection without wasting time performing several traditional initialization tasks. In a typical practical system, the quick reconnect process can be employed to reestablish the data mode in less than 1.5 seconds.

An alternate version of the quick reconnect procedure may employ a timing diagram similar to timing diagram 1500 (see FIG. 10). However, in such an embodiment, several of the signal segments described above in connection with timing diagram 1500 can be reduced in length, thus reducing the conventional reconnect time. For example, the various TRN training sequences and the parameter exchange signals may be shortened considerably because they need not convey essential information. For practical implementation reasons, it may be desirable to keep the general sequence structure intact in this manner (instead of eliminating segments from timing diagram 1500). Indeed, from a software implementation standpoint, segment lengths can be adjusted in a relatively straightforward manner, while the removal of entire segments from an existing protocol may be a time consuming and arduous task. Although the reconnect time for such an alternate embodiment may be longer than that described above in connection with timing diagram 2600 (e.g., up to 2.5 seconds), it is still significantly less than the time required to perform a conventional reinitialization procedure.

In summary, the present invention provides techniques to reduce the initialization period and reconnect period normally associated with a V.90 modem system. The quick startup and quick reconnect techniques leverage the known channel characteristics of a previous connection to reduce the training time associated with subsequent attempts to establish the same connection. Although not limited to any specific modem application, the quick startup procedure may be used to eliminate portions of the initialization protocols or processes normally employed by a 56 kbps modem, e.g., V.8bis, V.8, digital impairment learning, initial training, probing and ranging, or the like. In addition, the quick startup technique may perform certain operations at a different time or in a different order in comparison to a conventional modem startup technique.

The present invention has been described above with reference to a preferred embodiment. However, those skilled in the art will recognize that changes and modifications may be made to the preferred embodiment without departing from the scope of the present invention. These and other changes or modifications are intended to be included within the scope of the present invention, as expressed in the following claims.

Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A method of reducing time for use by a first modem to connect to a second modem via a communication channel, said first modem being in communication with a handset, said method comprising:
   receiving a first digital impairment learning sequence from said second modem over said communication channel;
   determining first one or more digital impairment attributes of said communication channel based on analyzing said first digital impairment learning sequence;
   interrupting said communication channel;
   terminating said interrupting;
   receiving a signal point sequence from said second modem;
   determining second one or more digital impairment attributes of said communication channel based on analyzing said signal point sequence;
   initializing said first modem with said one or more parameters to reconnect to said second modem if said first one or more digital impairment attributes are similar to corresponding said second one or more digital impairment attributes;
   wherein said first modem comprises,
      an off-hook detector capable of detecting said handset going off-hook, while said first modem is in communication with said second modem, and further being capable of generating an attention signal in response thereto; and
      a transmitter capable of transmitting a hold request to said second modem in response to said attention signal;
   wherein said handset is placed off-hook by a user for dialing an outgoing call, and wherein said communication between said modems over said communication channel ceases for a period of time after transmitting said hold request, and wherein said first modem keeps an upper layer protocol alive during said period of time.

2. The method of claim 1, wherein said hold request includes said period of time.

3. The method of claim 1, wherein said hold request is transmitted using a secondary channel.

4. The method of claim 1, wherein said first modem receives an acknowledgement in response to said hold request.

5. The method of claim 1, wherein a modem signal used for data communication between said first modem and said second modem is interrupted after said transmitter transmits said hold request to said second modem.

6. The method of claim 1, wherein said signal point sequence is a modified answer tone.

7. The method of claim 6, wherein said modified answer tone is an ANSpcm signal.

8. The method of claim 1, further comprising:
   obtaining one or more parameters for initializing said first modem for connection over said communication channel;
   storing said one or more parameters at said first modem;
   wherein said terminating said interrupting comprises transmitting a reconnect indication after said interrupting and wherein said signal point sequence is received from said second modem in response to said reconnect indication.

9. The method according to claim 1, wherein said interrupting disconnects said first modem from said second modem.

10. The method according to claim 9, wherein said terminating includes dialing a phone number associated with said second modem.

11. The method according to claim 1, wherein said interrupting places communication between said first modem and second modem on hold.

12. The method according to claim 11, wherein said terminating is performed without dialing a phone number associated with said second modem.

13. The method according to claim 1, wherein said one or more of parameters comprise data associated with equalizer settings for said first modem.

14. A communication method of reducing time for use between a first modem and a second modem in communication over a communication channel, said first modem being in communication with a handset, said communication method comprising the steps of:
   configuring a quick reconnect sequence comprising:
      receiving a first digital impairment learning sequence from said second modem over said communication channel;
      determining first one or more digital impairment attributes of said communication channel based on analyzing said first digital impairment learning sequence;
      interrupting said communication channel;
      terminating said interrupting;
      receiving a signal point sequence from said second modem;
      determining second one or more digital impairment attributes of said communication channel based on analyzing said signal point sequence;
      initializing said first modem with said one or more parameters to reconnect to said second modem if said first one or more digital impairment attributes are similar to corresponding said second one or more digital impairment attributes;
   configuring a modem on hold sequence comprising:
      detecting said handset going off-hook;
      transmitting a hold request to said second modem in response to said handset going off-hook;
      ceasing said communication with said second modem over said communication channel by said first modem for a period of time;
      causing a dial tone to be generated for dialing an outgoing call using said handset; and
      keeping an upper layer protocol alive during said period of time.

15. The communication method of claim 14, wherein said hold request includes said period of time.

16. The communication method of claim 14, wherein said transmitting step uses a secondary channel for transmitting said hold request.

17. The communication method of claim 14, further comprising the step of receiving an acknowledgement in response to said hold request.

18. The communication method of claim 14, wherein a modem signal used for data communication between said first modem and said second modem is interrupted after said transmitting step.

19. The communication method according to claim 14, wherein said signal point sequence is an ANSpcm signal.

20. The communication method according to claim 19, further comprising a step of receiving a reply signal prior to said receiving said ANSpcm signal, wherein said reply signal comprising a transition sequence configured to enable said first modem to determined robbed bit signaling characteristics of said communication channel.

21. The communication method according to claim 20, wherein said transition sequence comprises positive and negative value of at least one signal point.

22. A first modem capable of communicating with a second modem over a communication channel, a portion of said communication channel existing over a telephone line between said first modem and a central office, said first modem comprising:

a receiver capable of receiving a relinquishment request, while said telephone line is in use by said first modem for communication w a transmitter capable of transmitting a hold request to said second modem to place said communication between said modems on hold;

wherein said communication between said modems is placed on hold and said use of said telephone line is relinquished, and wherein said first modem causes a dial tone to be generated over said telephone line after said communication between said modems is placed on hold, and wherein said first modem keeps an upper layer protocol alive while said modems are on hold;

a memory element configured to store first one or more digital impairment attributes of said communication channel and further store one or more parameters for initializing said first modem for connection over said communication channel;

a receiver section configured to receive a first digital impairment learning sequence from said second modem, and further receive a reply signal from said second modem over said communication channel in response to a request transmitted by said first modem over said communication channel to terminate a temporary interruption in said communication channel; and a processor element configured to analyze said first digital impairment learning sequence to determine said first one or more digital impairment attributes of said communication channel and store said one or more digital impairment attributes in said memory, and to initialize said first modem with said one or more parameters in response to said reply signal if said processor determines that second one or more digital impairment attributes of said communication channel based on analyzing said reply signal are similar to said first one or more digital impairment attributes.

23. The first modem of claim 22, wherein a handset shares said telephone line with said first modem, and wherein said relinquishment request is received as a result of said handset going off-hook.

24. The first modem of claim 22, wherein said relinquishment request is received as a result of instructing said first modem to dial a number.

25. The first modem of claim 22, wherein a third device shares said telephone line with said first modem, and wherein said relinquishment request is received from said third device.

26. The first modem of claim 25, wherein said third device places a call on said telephone line.

27. The first modem of claim 22, wherein said dial tone is received as a result of using a three-way call feature supported by said central office.

28. The first modem of claim 22, wherein said reply signal is an ANSpcm signal.

29. The first modem according to claim 22, wherein said first modem is compatible with ITU-T Recommendation V.90.

30. The first modem according to claim 22, wherein said one or more of parameters comprise data associated with equalizer settings for said first modem.

* * * * *

UNITED STATES PATENT AND TRADEMARK OFFICE
CERTIFICATE OF CORRECTION

PATENT NO. : 7,634,070 B2  Page 1 of 1
APPLICATION NO. : 11/412809
DATED : December 15, 2009
INVENTOR(S) : Olafsson et al.

It is certified that error appears in the above-identified patent and that said Letters Patent is hereby corrected as shown below:

In claim 22, column 33, line 26, delete "w" and insert --;--

Signed and Sealed this

Second Day of February, 2010

David J. Kappos
*Director of the United States Patent and Trademark Office*

UNITED STATES PATENT AND TRADEMARK OFFICE
CERTIFICATE OF CORRECTION

PATENT NO. : 7,634,070 B2
APPLICATION NO. : 11/412809
DATED : December 15, 2009
INVENTOR(S) : Olafsson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 902 days.

Signed and Sealed this

Ninth Day of November, 2010

David J. Kappos
*Director of the United States Patent and Trademark Office*